(12) United States Patent
Alexander et al.

(10) Patent No.: US 8,392,552 B2
(45) Date of Patent: Mar. 5, 2013

(54) SYSTEM AND METHOD FOR PROVIDING CONFIGURABLE SECURITY MONITORING UTILIZING AN INTEGRATED INFORMATION SYSTEM

(75) Inventors: Bruce Alexander, Poulsbo, WA (US); Paul Talley, Redmond, WA (US); Jeffrey Hicks, Shoreline, WA (US)

(73) Assignee: Vig Acquisitions Ltd., L.L.C., Wilmington, DE (US)

( * ) Notice: Subject to any disclaimer, the term of this patent is extended or adjusted under 35 U.S.C. 154(b) by 500 days.

(21) Appl. No.: 10/116,351

(22) Filed: Apr. 3, 2002

(65) Prior Publication Data
US 2002/0143938 A1  Oct. 3, 2002

Related U.S. Application Data

(63) Continuation-in-part of application No. 09/825,506, filed on Apr. 3, 2001, now Pat. No. 7,627,665.

(60) Provisional application No. 60/281,258, filed on Apr. 3, 2001.

(51) Int. Cl.
*G06F 15/16* (2006.01)

(52) U.S. Cl. ........ 709/224; 709/201; 709/229; 340/506; 702/188

(58) Field of Classification Search .................. 709/224, 709/201, 229; 702/188; 340/506
See application file for complete search history.

(56) References Cited

U.S. PATENT DOCUMENTS

| | | |
|---|---|---|
| 3,757,039 A | 9/1973 | Brewer |
| 4,216,375 A | 8/1980 | Ulch et al. |
| 4,218,690 A | 8/1980 | Ulch et al. |
| 4,581,634 A | 4/1986 | Williams |
| 4,714,995 A | 12/1987 | Materna et al. |
| 4,721,954 A | 1/1988 | Mauch |
| 4,816,658 A | 3/1989 | Khandwala et al. |
| 4,837,568 A | 6/1989 | Snaper |
| 4,839,640 A | 6/1989 | Ozer et al. |
| 4,962,473 A | 10/1990 | Crain |
| 4,998,279 A | 3/1991 | Weiss |
| 5,086,385 A | 2/1992 | Launey et al. |
| 5,097,505 A | 3/1992 | Weiss |
| 5,204,670 A | 4/1993 | Stinton |

(Continued)

FOREIGN PATENT DOCUMENTS

| | | |
|---|---|---|
| EP | 0804031 A | 10/1997 |
| EP | 0967766 A2 | 12/1999 |

(Continued)

OTHER PUBLICATIONS

Bertsch, L.A., "Development Tools for Home Automation," IEEE Transactions on Consumer Electronics 36(4):854-858, Nov. 1990.

(Continued)

*Primary Examiner* — Kyung H Shin
(74) *Attorney, Agent, or Firm* — Knobbe Martens Olson & Bear, LLP

(57) ABSTRACT

A system and method for implementing an integrated information system are provided. A premises server is in communication with a variety of information sources that produce monitoring data for a premises. The premises server collects, presents, and transmits the monitoring device data to a central server capable of processing data from multiple premises servers. The central server receives the data and traverses one or more logical rule sets to determine whether the inputted data violates the rules. Based on an evaluation of the rules, the central server generates outputs in the form of communication to one or more authorized users via a variety of communication mediums and devices and/or the instigation of a variety of acts corresponding to the evaluation of the rules.

35 Claims, 15 Drawing Sheets

U.S. PATENT DOCUMENTS

| | | | |
|---|---|---|---|
| 5,210,873 A | 5/1993 | Gay et al. |
| 5,367,624 A | 11/1994 | Cooper |
| 5,465,358 A | 11/1995 | Blades et al. |
| 5,475,375 A | 12/1995 | Barrett et al. |
| 5,475,378 A | 12/1995 | Kaarsoo et al. |
| 5,491,511 A | 2/1996 | Odle |
| 5,499,356 A | 3/1996 | Eckert et al. |
| 5,506,986 A | 4/1996 | Healy |
| 5,541,911 A | 7/1996 | Nilakantan et al. |
| 5,544,062 A | 8/1996 | Johnston, Jr. |
| RE35,336 E | 9/1996 | Ulch et al. |
| 5,600,368 A | 2/1997 | Matthews, III |
| 5,614,890 A | 3/1997 | Fox |
| 5,619,183 A | 4/1997 | Ziegra et al. |
| 5,629,981 A | 5/1997 | Nerlikar |
| 5,654,696 A | 8/1997 | Barrett et al. |
| 5,664,186 A | 9/1997 | Bennett et al. |
| 5,675,738 A | 10/1997 | Suzuki et al. |
| 5,678,039 A | 10/1997 | Hinks et al. |
| 5,680,328 A | 10/1997 | Skorupski et al. |
| 5,682,142 A | 10/1997 | Loosmore et al. |
| 5,717,379 A | 2/1998 | Peters |
| 5,729,471 A | 3/1998 | Jain et al. |
| 5,732,232 A | 3/1998 | Brush, II et al. |
| 5,742,286 A | 4/1998 | Kung et al. |
| 5,758,340 A | 5/1998 | Nail |
| 5,768,119 A | 6/1998 | Havekost et al. |
| 5,771,354 A | 6/1998 | Crawford |
| 5,810,747 A | 9/1998 | Brudny et al. |
| 5,813,009 A | 9/1998 | Johnson et al. |
| 5,821,855 A | 10/1998 | Lewis |
| 5,828,848 A | 10/1998 | MacCormack |
| 5,838,368 A | 11/1998 | Masunaga et al. |
| 5,838,682 A | 11/1998 | Dekelbaum et al. |
| 5,844,501 A | 12/1998 | El-Ibiary |
| 5,848,143 A | 12/1998 | Andrews et al. |
| 5,870,733 A | 2/1999 | Bass et al. |
| 5,872,594 A | 2/1999 | Thompson |
| 5,879,163 A | 3/1999 | Brown et al. |
| 5,903,455 A | 5/1999 | Sharpe, Jr. et al. |
| 5,903,730 A | 5/1999 | Asai et al. |
| 5,905,436 A | 5/1999 | Dwight et al. |
| 5,917,405 A | 6/1999 | Joao |
| 5,923,264 A | 7/1999 | Lavelle et al. |
| 5,937,415 A | 8/1999 | Sheffield et al. |
| 5,943,673 A | 8/1999 | Felouzis et al. |
| 5,960,174 A | 9/1999 | Dew |
| 5,963,131 A | 10/1999 | D'Angelo et al. |
| 5,982,362 A | 11/1999 | Crater et al. |
| 5,987,519 A | 11/1999 | Peifer et al. |
| 5,990,885 A | 11/1999 | Gopinath |
| 6,002,994 A | 12/1999 | Lane et al. |
| 6,011,547 A | 1/2000 | Shiota et al. |
| 6,012,100 A | 1/2000 | Frailong et al. |
| 6,023,223 A | 2/2000 | Baxter, Jr. |
| 6,031,455 A | 2/2000 | Grube et al. |
| 6,041,347 A | 3/2000 | Harsham et al. |
| 6,064,316 A | 5/2000 | Glick et al. |
| 6,064,723 A | 5/2000 | Cohn et al. |
| 6,070,228 A | 5/2000 | Belknap et al. |
| 6,075,553 A | 6/2000 | Freeman et al. |
| 6,076,111 A | 6/2000 | Chiu et al. |
| 6,085,227 A | 7/2000 | Edlund et al. |
| 6,091,771 A | 7/2000 | Seeley et al. |
| 6,115,040 A | 9/2000 | Bladow et al. |
| 6,133,941 A | 10/2000 | Ono |
| 6,157,935 A | 12/2000 | Tran et al. |
| 6,157,956 A | 12/2000 | Jensen et al. |
| 6,166,729 A | 12/2000 | Acosta et al. |
| 6,167,358 A | 12/2000 | Othmer et al. |
| 6,182,142 B1 * | 1/2001 | Win et al. ............ 709/229 |
| 6,185,316 B1 | 2/2001 | Buffam |
| 6,188,973 B1 | 2/2001 | Martinez et al. |
| 6,215,405 B1 | 4/2001 | Handley |
| 6,219,439 B1 | 4/2001 | Burger |
| 6,226,031 B1 | 5/2001 | Barraclough et al. |
| 6,229,429 B1 | 5/2001 | Horon |
| 6,233,588 B1 | 5/2001 | Marchoili et al. |
| 6,239,833 B1 | 5/2001 | Ozaki et al. |
| 6,243,129 B1 | 6/2001 | Deierling |
| 6,250,452 B1 * | 6/2001 | Partyka et al. ............ 194/217 |
| 6,271,752 B1 | 8/2001 | Vaios |
| 6,271,805 B1 | 8/2001 | Yonezawa |
| 6,281,790 B1 | 8/2001 | Kimmel et al. |
| 6,289,380 B1 | 9/2001 | Battat et al. |
| 6,297,746 B1 | 10/2001 | Nakazawa et al. |
| 6,298,474 B1 | 10/2001 | Blowers et al. |
| 6,304,857 B1 | 10/2001 | Heindel et al. |
| 6,308,205 B1 | 10/2001 | Carcerano et al. |
| 6,311,210 B1 | 10/2001 | Foladare et al. |
| 6,324,647 B1 | 11/2001 | Bowman-Amuah |
| 6,353,853 B1 | 3/2002 | Gravlin |
| 6,356,949 B1 | 3/2002 | Katsandres et al. |
| 6,362,836 B1 | 3/2002 | Shaw et al. |
| 6,363,422 B1 | 3/2002 | Hunter |
| 6,366,686 B1 | 4/2002 | Schroeder et al. |
| 6,369,695 B1 | 4/2002 | Horon |
| 6,393,387 B1 | 5/2002 | Adriaans et al. |
| 6,412,359 B1 | 7/2002 | Zborowski et al. |
| 6,429,893 B1 | 8/2002 | Xin |
| 6,430,712 B2 | 8/2002 | Lewis |
| 6,430,740 B1 | 8/2002 | Hart et al. |
| 6,437,692 B1 | 8/2002 | Petite |
| 6,446,200 B1 | 9/2002 | Ball et al. |
| 6,460,141 B1 * | 10/2002 | Olden ............ 726/4 |
| 6,483,878 B1 | 11/2002 | Yonezawa et al. |
| 6,498,987 B1 | 12/2002 | Kelly et al. |
| 6,499,054 B1 | 12/2002 | Hesselink et al. |
| 6,504,479 B1 | 1/2003 | Lemons et al. |
| 6,519,540 B1 | 2/2003 | Salandro |
| 6,529,475 B1 | 3/2003 | Wan et al. |
| 6,529,936 B1 | 3/2003 | Mayo et al. |
| 6,542,075 B2 * | 4/2003 | Barker et al. ............ 340/506 |
| 6,549,130 B1 | 4/2003 | Joao |
| 6,553,336 B1 * | 4/2003 | Johnson et al. ............ 702/188 |
| 6,560,557 B1 | 5/2003 | Carnahan |
| 6,564,380 B1 | 5/2003 | Murphy |
| 6,567,536 B2 | 5/2003 | McNitt et al. |
| 6,580,451 B2 | 6/2003 | Yonezawa et al. |
| 6,583,720 B1 * | 6/2003 | Quigley ............ 340/521 |
| 6,598,090 B2 | 7/2003 | Champlin |
| 6,606,304 B1 | 8/2003 | Grinter |
| 6,611,206 B2 | 8/2003 | Eshelman et al. |
| 6,618,074 B1 | 9/2003 | Seeley |
| 6,631,271 B1 | 10/2003 | Logan |
| 6,646,675 B1 * | 11/2003 | Tang et al. ............ 348/143 |
| 6,654,060 B1 | 11/2003 | Kurosawa et al. |
| 6,680,730 B1 | 1/2004 | Shields |
| 6,686,838 B1 | 2/2004 | Rezvani et al. |
| 6,690,411 B2 | 2/2004 | Naidoo |
| 6,697,103 B1 * | 2/2004 | Fernandez et al. ............ 348/143 |
| 6,697,341 B1 | 2/2004 | Roy |
| 6,698,021 B1 | 2/2004 | Amini et al. |
| 6,704,284 B1 | 3/2004 | Stevenson et al. |
| 6,714,977 B1 | 3/2004 | Fowler et al. |
| 6,721,391 B2 | 4/2004 | McClelland et al. |
| 6,738,811 B1 | 5/2004 | Liang |
| 6,741,171 B2 | 5/2004 | Palka et al. |
| 6,748,446 B2 * | 6/2004 | Sato et al. ............ 709/241 |
| 6,754,546 B1 | 6/2004 | Hindus et al. |
| 6,839,850 B1 | 1/2005 | Campbell et al. |
| 6,889,264 B2 | 5/2005 | Clough et al. |
| 6,904,458 B1 | 6/2005 | Bishop et al. |
| 6,938,022 B1 * | 8/2005 | Singhal ............ 705/74 |
| 6,947,988 B1 | 9/2005 | Saleh |
| 6,954,701 B2 | 10/2005 | Wolfe |
| 6,954,859 B1 | 10/2005 | Simerly et al. |
| 6,960,998 B2 | 11/2005 | Menard et al. |
| 6,970,167 B1 | 11/2005 | Kumamoto et al. |
| 6,970,183 B1 | 11/2005 | Monroe |
| 6,999,613 B2 | 2/2006 | Colmenarez |
| 7,000,014 B2 | 2/2006 | Poisson et al. |
| 7,003,670 B2 | 2/2006 | Heaven et al. |
| 7,013,334 B2 | 3/2006 | Toyoshima et al. |
| 7,035,332 B2 | 4/2006 | He et al. |
| 7,039,205 B1 | 5/2006 | Carter et al. |
| 7,053,767 B2 | 5/2006 | Petite et al. |

| | | | |
|---|---|---|---|
| 7,069,234 B1 | 6/2006 | Cornelius et al. | |
| 7,123,700 B1 | 10/2006 | Weaver, III et al. | |
| 7,124,427 B1 | 10/2006 | Esbensen | |
| 7,190,292 B2 | 3/2007 | Bizjak | |
| 7,269,625 B1* | 9/2007 | Willhide et al. | 709/206 |
| 2001/0033330 A1 | 10/2001 | Garoutte | |
| 2001/0034586 A1 | 10/2001 | Ewert | |
| 2001/0034754 A1* | 10/2001 | Elwahab et al. | 709/201 |
| 2002/0019945 A1 | 2/2002 | Houston et al. | |
| 2002/0029263 A1 | 3/2002 | Toyoshima et al. | |
| 2002/0031230 A1 | 3/2002 | Sweet et al. | |
| 2002/0051061 A1 | 5/2002 | Peters et al. | |
| 2002/0087289 A1 | 7/2002 | Halabieh | |
| 2002/0120727 A1 | 8/2002 | Curley et al. | |
| 2002/0138663 A1 | 9/2002 | Ladwig | |
| 2002/0171551 A1 | 11/2002 | Eshelman et al. | |
| 2002/0188854 A1 | 12/2002 | Heaven et al. | |
| 2002/0191639 A1 | 12/2002 | Norby | |
| 2002/0198990 A1 | 12/2002 | Bradfield et al. | |
| 2003/0131065 A1 | 7/2003 | Neufeld et al. | |
| 2003/0167153 A1 | 9/2003 | Alexander | |
| 2003/0172138 A1 | 9/2003 | McCormack et al. | |
| 2004/0098623 A1 | 5/2004 | Scheidell | |
| 2004/0132432 A1 | 7/2004 | Moores et al. | |
| 2005/0222820 A1 | 10/2005 | Chung | |
| 2005/0248474 A1 | 11/2005 | Wiser et al. | |
| 2006/0041616 A1 | 2/2006 | Ludwig et al. | |
| 2006/0277299 A1 | 12/2006 | Baekelmans et al. | |
| 2007/0150955 A1 | 6/2007 | Murase et al. | |
| 2007/0226796 A1 | 9/2007 | Gilbert et al. | |
| 2007/0296817 A1 | 12/2007 | Ebrahimi et al. | |
| 2008/0091490 A1 | 4/2008 | Abrahams et al. | |
| 2008/0109879 A1 | 5/2008 | Bhagwat et al. | |

FOREIGN PATENT DOCUMENTS

| | | | |
|---|---|---|---|
| GB | 2325548 A | | 11/1998 |
| WO | 97/07486 | * | 2/1997 |
| WO | WO 97/07486 A | | 2/1997 |
| WO | WO 01/28251 | | 4/2001 |

OTHER PUBLICATIONS

Corcoran, P.M., and J. Desbonnet, "Browser-Style Interfaces to a Home Automation Network," IEEE Transactions on Consumer Electronics 43(4):1063-1069, Nov. 1997.

Corcoran, P.M., et al., "User Interface Technologies for Home Appliances and Networks," IEEE Transactions on Consumer Electronics 44(3):679-685, Aug. 1998.

Leeb, G., et al., "A Configuration Tool for HomeNet," IEEE Transactions on Consumer Electronics 42(3):387-394, Aug. 1996.

Tsai, S.-M., et al., "A Service of Home Security on an Intelligent Network," IEEE Transactions on Consumer Electronics 44(4):1360-1366, Nov. 1998.

Williams, T., "Tools and Protocols Link Embedded Systems Over the Internet," Electronic Design 45(17):91-98, Aug. 18, 1997.

EyeCast.com Introduces SchoolCast services for School Safety Officials and Law Enforcement Agencies, Press Release dated Apr. 28, 1999.

EyeCast.com Adds 360-degree Continuous Pan Rotation Cameras to It's[sic] EyeView Service, Press Release dated Mar. 15, 1999.

Screen Printing from www.remotecams.com, "Take a Step Into the Future . . . ," printed Sep. 17, 1999.

EyeCast.com, "EyeCast secures deals . . . ," *Washington Business Journal*, Aug. 13-19, 1999, Tech Section, p. 16.

EyeCast.com Announces EyeView Control, Press Release dated Oct. 12, 1998.

EyeCast Announces EyeCapture Services, Press Release dated Jul. 8, 1998.

EyeCast.com, Inc., "Providing Live Interactive Video for Surveillance & Monitoring Over the Internet".

Axis Communications, publication entitled "Axis 200+ Web Camera".

Axis Communications, publication entitled "Axis 240 Camera Server".

Axis Communications, www.axis.se/products/cam_240/, "30 Frames/Second," printed Sep. 28, 1999.

Axis Communications, ww.axis.se/products/camera_servers/cam_app_sol.htm, "Network Cameras Applications and Solutions," printed Sep. 28, 1999.

Axis Communications, www.axis.se/products/camera_servers/cam_fb.html, "Features and Benefits," printed Sep. 28, 1999.

Muller, N.J., "Focus on Openview: A Guide to Hewlett-Packard's Network and Systems Management Platforms," CBM Books, Fort Washington, Pennsylvania, 1995, pp. 123-133.

* cited by examiner ic # SYSTEM AND METHOD FOR PROVIDING CONFIGURABLE SECURITY MONITORING UTILIZING AN INTEGRATED INFORMATION SYSTEM

CROSS-REFERENCES TO RELATED APPLICATIONS

This application is a continuation-in-part of U.S. patent application Ser. No. 09/825,506 entitled SYSTEM AND METHOD FOR PROVIDING CONFIGURABLE SECURITY MONITORING UTILIZING AN INTEGRATED INFORMATION SYSTEM and filed on Apr. 3, 2001, which claims the benefit of U.S. Provisional Application No. 60/236,282, filed Sep. 28, 2000. U.S. application Ser. No. 09/825,506 is incorporated by reference herein. This application further claims the benefit of U.S. Provisional Application No. 60/281,258 filed on Apr. 3, 2001. U.S. Provisional Application No. 60/281,258 is incorporated by reference herein.

FIELD OF THE INVENTION

The present invention relates generally to a security monitoring network and, in particular, to a system and method for providing variable, remote monitoring of a locally detected event utilizing an integrated information system.

BACKGROUND OF THE INVENTION

Generally described, electronic security systems are configured to provide a wide range of security services in both residential and commercial settings. The types of monitoring devices utilized by a particular security system to perform the system service depend greatly on the sophistication of the security system configuration and the overall function of the security system. A majority of conventional security systems include intrusion detecting devices, such as door or window contacts, glass break detectors, motion detectors and the like. In a commercial setting, closed-circuit television ("CCTV"), badging systems, asset tracking, and access control devices and sensors are also utilized.

The configuration of the security system is based on the function the system will serve. For example, in one aspect, a typical electronic security system may be used to provide smoke, fire, and/or carbon monoxide detection. Accordingly, the system would utilize one or more smoke, fire and/or carbon monoxide detectors within one or more locations on the premises. In another aspect, the security system may also be utilized to provide motion or access detection as well as general video and audio monitoring of the premises. Accordingly, the system would utilize ingress or egress sensors and/or or video cameras within the premises.

While the conventional art generally discloses utilizing multiple monitoring devices to perform various functions, conventional systems are deficient in data management functionality and integration. Security data from different monitoring device types is generally not integrated to affect the system reporting and control. Instead, the conventional security system is built around independent stand-alone devices that require human control and interpretation.

In one security configuration, contract or in-house security guard and patrol services are employed in a range of industrial commercial, public and private settings. The primary functions of the security guard may include direct visual surveillance, the monitoring of security cameras or other security devices, a reception or access control and authorization function, and incident response. A security guard may also be used to monitor a number of CCTV screens arranged in a bank formation. Accordingly, the security guard accepts the variety of inputs and makes a determination of a security alert, such as an unauthorized entrance.

The use of dedicated monitoring services, such as security guards is generally prohibitively expensive and unavailable for a majority of individuals and businesses. Additionally, if the guard is distracted, absent or inattentive, a security event may go unreported. Furthermore, the monitoring device data, such as the CCTV data, is typically available only to the dedicated premises monitor and cannot be utilized concurrently by additional users, such as a remote monitor, a quality control supervisor, the owner of the premises, or emergency or public safety authorities. Moreover, a single security guard may not be capable of processing all of the possible monitoring data sources simultaneously, thereby reducing the effectiveness of multiple monitoring devices.

Another security system configuration utilizes external monitors to provide the security services. Generally described, external monitoring systems are more cost effective than a dedicated on-premises monitor. However, most external monitoring systems have a limited effectiveness in being unable to extensively provide and/or review detailed security information. For example, most conventional external monitoring systems cannot incur the expense of providing a sufficient amount of communication bandwidth to transmit continuous video/audio feeds from every monitored premises. Accordingly, if the external monitoring service detects an unauthorized entry into a premises, such as through a signal from a detecting device, the monitoring service typically dispatches emergency or public safety authorities to investigate and determine the extent of the detected event. In a vast majority of cases, the alarm is false and the premises owner incurs a fine for having the authorities verify the incident. Additionally, in the event of an actual emergency, the monitoring service cannot provide the public safety authorities with sufficient information to assess the situation with monitoring devices, thereby putting the authorities at greater risk.

Similar to the dedicated on-premises monitoring, the remote monitoring service also cannot concurrently process the device information to multiple authorized users for various purposes. For example, a premises owner may need to access video data to locate a pet within the premises, while emergency or public safety personnel would need to access the same video data to identify the location of a victim. In both cases, the monitoring service likely cannot provide the information to the user on a wide scale basis.

Some conventional security system configurations attempt to integrate at least some security monitoring devices to better detect alarm conditions from a remote user. For example, a security system monitor (either remote or on-premises) may detect an unauthorized entry from a motion detector and confirm it by utilizing a video camera. Generally however, these systems are directed towards a combination of video surveillance and are limited into being processed solely for the detection of an intrusion or the verification of an intrusion. These systems generally cannot accept additional non-security information inputs that relate generally to the management of the premises and that are outside of the scope of conventional security monitoring. Moreover, these systems are deficient in that the data cannot be processed concurrently or distributed to multiple authorized users.

In addition to the above-mentioned deficiencies in the conventional art, some monitoring systems, either with a on-premises guard or an external monitor, are further deficient in creating an uncomfortable environment by monitoring (and often recording) on a continuous basis. For example, it may be advantageous to have video access to a public restroom in the event of a medical emergency. However, one skilled in the relevant art will appreciate that the constant monitoring of a public restroom creates an uncomfortable environment for patrons utilizing the facilities during non-emergencies. Additionally, continuous monitoring of areas not prone to have a high rate of emergencies quickly becomes expensive. For example, the constant monitoring of a parking lot during typically off-peak hours presents a great expense to a parking lot provider. Accordingly, many parking lots are left to be monitored by attendants that may have a variety of functions, such as collection, access control, etc.

Thus, there is a need for an integrated information system that can obtain any variety of monitoring device inputs, process any combination of the inputs, and provide customized outputs according to the needs and rights of an authorized user.

SUMMARY OF THE INVENTION

A system and method for implementing an integrated information system are provided. A premises server is in communication with a variety of information sources that produce monitoring data for a premises. The premises server collects, presents, and transmits the monitoring device data to a central server capable of processing data from multiple premises servers. The central server receives the data and traverses one or more logical rule sets to determine whether the inputted data violates the rules. Based on an evaluation of the rules, the central server generates outputs in the form of communication to one or more authorized users via a variety of communication mediums and devices and/or the instigation of a variety of acts corresponding to the evaluation of the rules.

In accordance with the present invention, a method for providing an integrated information system in a system having at least one monitoring device is provided. A computing device obtains monitoring device data from a computing device network access monitoring device, wherein the computing device network access monitoring device monitors a user attempt to access the computing device network. The computing device obtains one or more rules corresponding to the network access monitoring device. The one or more rules indicate access rights to a computing device network. The computing device processes the monitoring device data according to the monitoring rules to determine whether a user attempting to log onto the computing device network has access rights to the network. The computing device then generates an output corresponding to the processing of the monitoring device data. The output either grants or denies access to the computing device network.

In accordance with another aspect of the present invention, a method for providing an integrated information system in a system having at least one monitoring device is provided. A computing device obtains monitoring device data from an information distribution monitoring device and obtains one or more rules corresponding to the information distribution monitoring device. The one or more rules establish access rights to distribute personal information corresponding to an identifiable person. The computing device processes the monitoring device data to determine whether a user is attempting to distribute information corresponding to the identifiable person has access rights to distribute the personal information. The computing device generates an output corresponding to the processing of the monitoring device data. The output either grants or denies distribution rights to the personal information.

In accordance with a further aspect of the present invention, a method for providing an integrated information system in a system having at least one monitoring device is provided. A computing device obtains monitoring device data from an identification tracking monitoring device and a location monitoring device and obtains one or more rules corresponding to the identification tracking and location monitoring devices. The one or more rules establish a threshold for the monitoring device data. The computing device processes the identification tracking and location monitoring device data according to the monitoring rules. The computing device then generates an output corresponding to the processing of the monitoring device data. The output includes generating a record tracking identification and location information.

In accordance with still a further aspect of the present invention, a method for providing an integrated information system in a system having at least one monitoring device is provided. A computing device obtains monitoring device data from a number of access control monitoring devices. Each access control monitoring device corresponds to an access control device. The computing device obtains one or more rules corresponding to the at least one monitoring device. The one or more rules establish access rights for each access control device. The computing device determines whether an identifiable individual has access rights to a particular access control device. Additionally, the computing device generates an output corresponding to the processing of the monitoring device data. The output includes either grants or denies access by the access control device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
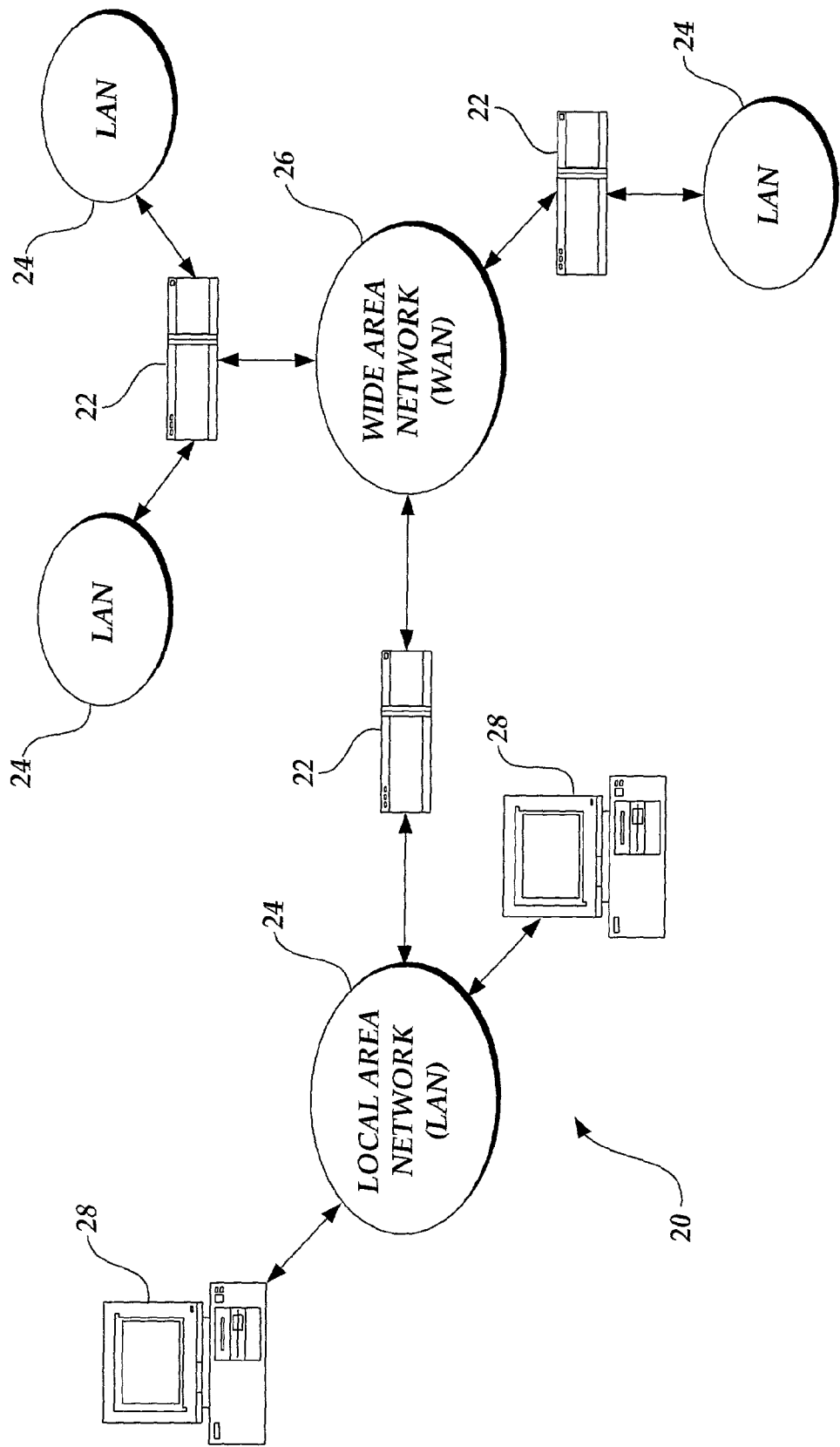
FIG. 1 is a block diagram of an Internet environment.

As described above, aspects of the present invention are embodied in a World Wide Web (the "WWW" or "web") site accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, in which a plurality of local area networks ("LANs") 24 and a wide area network ("WAN") 26 are interconnected by routers 22. The routers 22 are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, computers and other related electronic devices can be remotely connected to either the LANs 24 or the WAN 26 via a modem and temporary telephone or wireless link. It will be appreciated that the Internet 20 comprises a vast number of such interconnected networks, computers, and routers and that only a small, representative section of the Internet 20 is shown in FIG. 1. One skilled in the relevant art will appreciate that aspects of the present invention may be practiced on Internet networks, such as an Intranet.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML"), or other markup languages, that are electronically stored at "WWW sites" or "Web sites" throughout the Internet. A WWW site is a server connected to the Internet that has mass storage facilities for storing hypertext documents and that runs administrative software for handling requests for those stored hypertext documents. A hypertext document normally includes a number of hyperlinks, i.e., highlighted portions of text which link the document to another hypertext document possibly stored at a WWW site elsewhere on the Internet. Each hyperlink is associated with a Uniform Resource Locator ("URL") that provides the exact location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA® programming language from Sun Microsystems, for execution on a remote computer. Likewise, a WWW server may also include facilities for executing scripts and other application programs on the WWW server itself.

A consumer or other remote consumer may retrieve hypertext documents from the WWW via a WWW browser application program. A WWW browser, such as Netscape's NAVIGATOR® or Microsoft's Internet Explorer, is a software application program for providing a graphical consumer interface to the WWW. Upon request from the consumer via the WWW browser, the WWW browser accesses and retrieves the desired hypertext document from the appropriate WWW server using the URL for the document and a protocol known as HyperText Transfer Protocol ("HTTP"). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA applets, for execution on the client computer.

Figure 2:
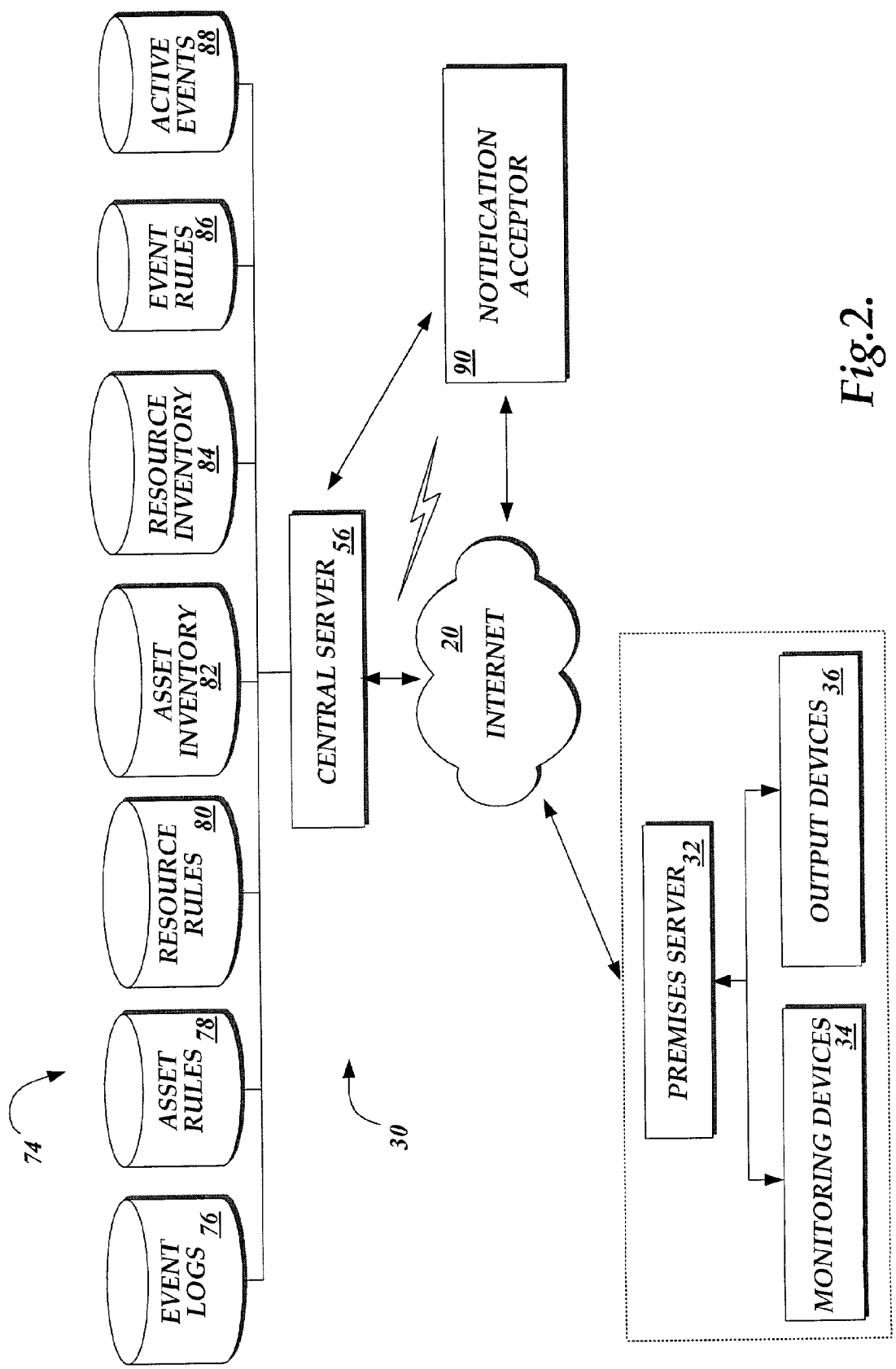
FIG. 2 is a block diagram of an integrated information system in accordance with the present invention.

Referring now to FIG. 2, an actual embodiment of an integrated information system 30 in accordance with the present invention will be described. An integrated information system 30 is a subscriber-based system allowing a number of monitoring devices within one or more premises to be processed at a single control location. Additionally, the data from the monitoring devices is processed according to one or more rules. The control location customizes output of the processed data to a number of authorized users dependent on the preferences and rights of the user. While the system of the present invention may be utilized to integrate traditional security monitoring functions, it may also be utilized to integrate any information input or function in a like manner.

With reference to FIG. 2, the integrated information system 30 includes a premises server 32 located on a premises. The premises server 32 communicates with one or more monitoring devices 34. In an illustrative embodiment, the monitoring devices 34 can include smoke, fire and carbon monoxide detectors. The monitoring devices 34 can also include door and window access detectors, glass break detectors, motion detectors, audio detectors and/or infrared detectors. Still further, the monitoring devices 34 can include computer network monitors, voice identification devices, video cameras, still cameras, microphones and/or fingerprint, facial, retinal, or other biometric identification devices. Still further, the monitoring devices 34 can include conventional panic buttons, global positioning satellite ("GPS") locators, other geographic locators, medical indicators, and vehicle information systems. The monitoring devices 34 can also be integrated with other existing information systems, such as inventory control systems, accounting systems, or the like. It will be apparent to one skilled in the relevant art that additional or alternative monitoring devices 34 may be practiced with the present invention.

The premises server 32 also communicates with one or more output devices 36. In an illustrative embodiment, the output devices 36 can include audio speakers, display or other audio/visual displays. The output devices 36 may also include electrical or electromechanical devices that allow the system to perform actions. The output devices 36 can include computer system interfaces, telephone interfaces, wireless interfaces, door and window locking mechanisms, aerosol sprayers, and the like. As will be readily understood by one skilled in the art, the type of output device is associated primarily with the type of action the information system 30 produces. Accordingly, additional or alternative output devices 36 are considered to be within the scope of the present invention. In accordance with the present invention, the monitoring devices 34 and the output devices 36 can be linked together in a computer network environment in which multiple premises servers 32, or device control specific computing devices, work in parallel, sharing data and processes. An example of a device control specific computing device environment can be found in commonly owned U.S. Provisional Application No. 60/281,254, entitled SYSTEM AND METHOD FOR MANAGING A DEVICE NETWORK and filed on Apr. 3, 2001. U.S. Provisional Application No. 60/281,254 is incorporated by reference. Moreover, additional premises servers 32, monitoring devices 34, and output devices 36 may be joined modularly to provide extensibility to the system.

Figure 3:
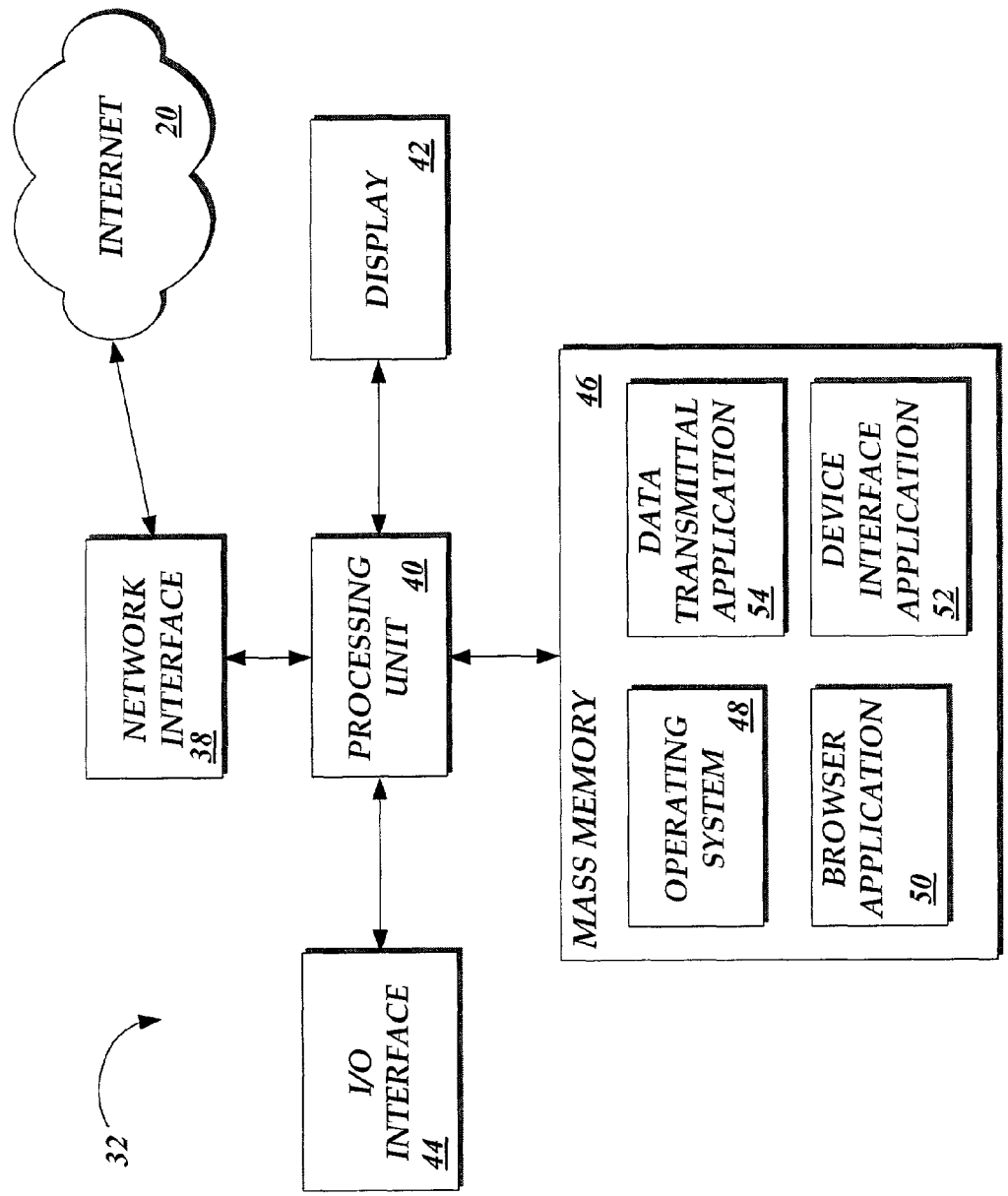
FIG. 3 is a block diagram depicting an illustrative architecture for a premises server in accordance with the present invention.

FIG. 3 is a block diagram depicting an illustrative architecture for a premises server 32. Those of ordinary skill in the art will appreciate that the premises server 32 includes many more components then those shown in FIG. 3. However, it is not necessary that all of these generally conventional components be shown in order to disclose an illustrative embodiment for practicing the present invention. As shown in FIG. 3, the premises server 32 includes a network interface 38 for connecting directly to a LAN or a WAN, or for connecting remotely to a LAN or WAN. Those of ordinary skill in the art will appreciate that the network includes the necessary circuitry for such a connection, and is also constructed for use with the TCP/IP protocol, the particular network configuration of the LAN or WAN it is connecting to, and a particular type of coupling medium. The premises server 32 may also be equipped with a modem for connecting to the Internet through a point to point protocol ("PPP") connection or a serial line Internet protocol ("SLIP") connection as known to those skilled in the art.

The premises server 32 also includes a processing unit 40, a display 42, an input/output (I/O) interface 44 and a mass memory 46, all connected via a communication bus, or other communication device. The I/O interface 44 includes hardware and software components that facilitate interaction with a variety of the monitoring devices via a variety of communication protocols including TCP/IP, X10, digital I/O, RS-232, RS-485 and the like. Additionally, the I/O interface 44 facilitates communication via a variety of communication mediums including telephone land lines, wireless networks (including cellular, digital and radio networks), cable networks and the like. In an actual embodiment of the present invention, the I/O interface is implemented as a layer between the server hardware and software applications utilized to control the individual monitoring devices. It will be understood by one skilled in the relevant art that alternative interface configurations may be practiced with the present invention.

The mass memory 46 generally comprises a RAM, ROM, and a permanent mass storage device, such as a hard disk drive, tape drive, optical drive, floppy disk drive, or combination thereof. The mass memory 46 stores an operating system 48 for controlling the operation of the premises server. It will appreciated that this component may comprise a general-purpose server operating system as is known to those skilled in the art, such as UNIX, LINUX™, or Microsoft WINDOWS NT®. The memory also includes a WWW browser 50, such as Netscape's NAVIGATOR® or Microsoft's Internet Explorer browsers, for accessing the WWW.

The mass memory 46 also stores program code and data for interfacing with various premises monitoring devices, for processing the monitoring device data and for transmitting the data to a central server. More specifically, the mass memory stores a device interface application 52 in accordance with the present invention for obtaining monitoring device data from a variety of devices and for manipulating the data for processing by the central server. The device interface application 52 comprises computer-executable instructions which, when executed by the premises server 32 obtains and transmits device data as will be explained below in greater detail. The mass memory 46 also stores a data transmittal application program 54 for transmitting the device data to a central server and to facilitate communication between the central server and the monitoring devices 34. The operation of the data transmittal application 54 will be described in greater detail below. It will be appreciated that these components may be stored on a computer-readable medium and loaded into the memory of the premises server using a drive mechanism associated with the computer-readable medium, such as a floppy, CD-ROM, DVD-ROM drive, or network drive.

Figure 4:
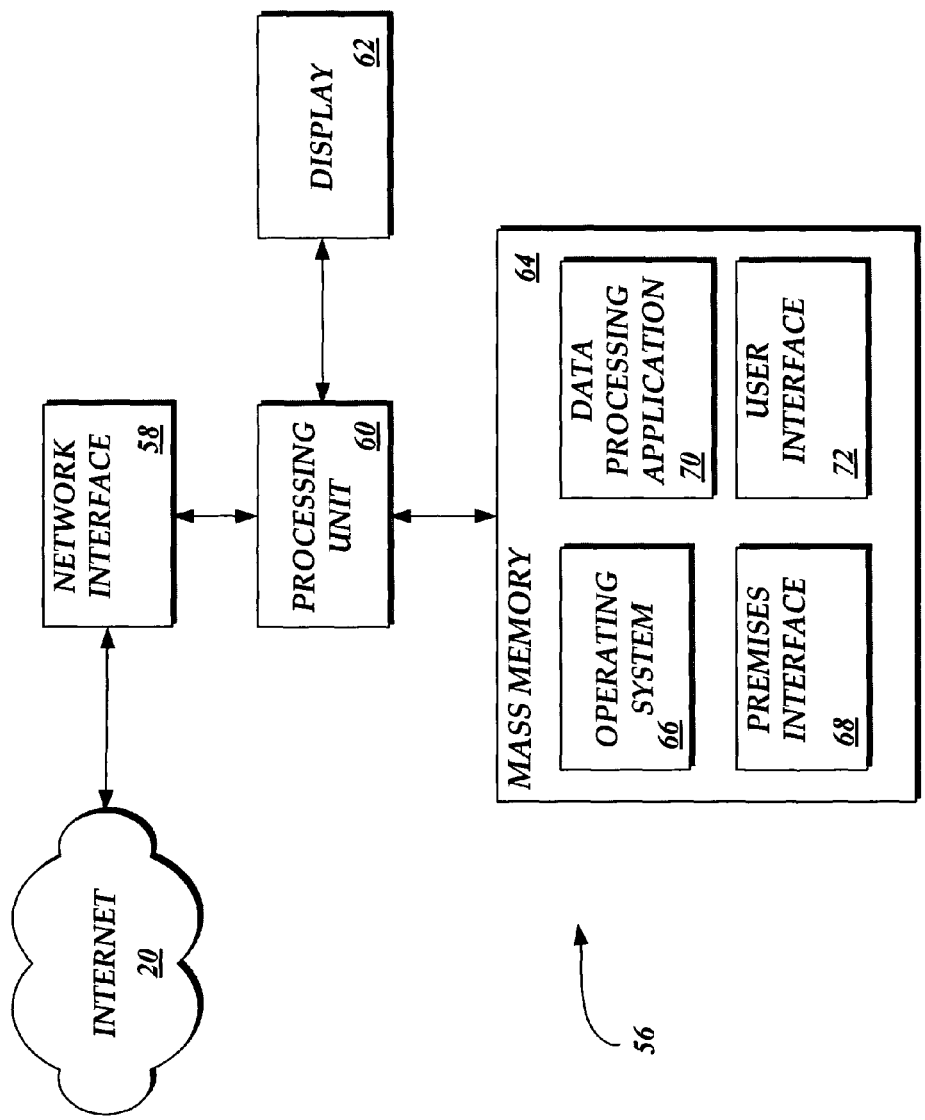
FIG. 4 is a block diagram depicting an illustrative architecture for a central server in accordance with the present invention.

Returning to FIG. 2, the premises server 32 is in communication with a central server 56. Generally described, the central server 56 obtains various monitoring device data, processes the data and outputs the data to one or more authorized users. In an illustrative embodiment, the communication between the central server 56 and the premises server 32 is remote and two-way. FIG. 4 is a block diagram depicting an illustrative architecture for a central server 56. Those of ordinary skill in the art will appreciate that the central server 56 includes many more components then those shown in FIG. 4. However, it is not necessary that all of these generally conventional components be shown in order to disclose an illustrative embodiment for practicing the present invention.

As shown in FIG. 4, the central server 56 includes a network interface 58 for connecting directly to a LAN or a WAN, or for connecting remotely to a LAN or WAN. Those of ordinary skill in the art will appreciate that the network interface includes the necessary circuitry for such a connection, and is also constructed for use with the TCP/IP protocol, the particular network configuration of the LAN or WAN it is connecting to, and a particular type of coupling medium. The central server 56 may also be equipped with a modem for connecting to the Internet 20.

The central server 56 also includes a processing unit 60, a display 62 and a mass memory 64, all connected via a communication bus, or other communication device. The mass memory 64 generally comprises a RAM, ROM, and a permanent mass storage device, such as a hard disk drive, tape drive, optical drive, floppy disk drive, or combination thereof. The mass memory 64 stores an operating system 66 for controlling the operation of the central server. It will be appreciated that this component may comprise a general-purpose server operating system.

The mass memory 64 also stores program code and data for interfacing with the premises devices, for processing the device data and for interfacing with various authorized users. More specifically, the mass memory 64 stores a premises interface application 68 in accordance with the present invention for obtaining data from a variety of monitoring devices and for communicating with the premises server. The premises interface application 68 comprises computer-executable instructions which, when executed by the central server 56, interfaces with the premises server 32 as will be explained below in greater detail. The mass memory 64 also stores a data processing application 70 for processing monitoring device data in accordance with rules maintained within the central server. The operation of the data processing application 70 will be described in greater detail below. The mass memory 64 further stores an authorized user interface application 72 for outputting the processed monitoring device data to a variety of authorized users in accordance with the security process of the present invention. The operation of the authorized user interface application 72 will be described in greater detail below. It will be appreciated that these components may be stored on a computer-readable medium and loaded into the memory of the central server using a drive mechanism associated with the computer-readable medium.

It will be understood by one skilled in the relevant art that the premises server 32 may be remote from the premises or may omitted altogether. In such an alternative embodiment, the monitoring devices 34 transmit the monitoring data to a remote premises server 32 or alternatively, they transmit the monitoring data directly to the central server 56.

Also in communication with the central server 56 is a central database 74. In an illustrative embodiment, the central database 74 includes a variety of databases including an event logs database 76, an asset rules database 78, a resource rules database 80, an asset inventory database 82, a resource inventory database 84, an event rules database 86 and an active events database 88. The utilization of the individual databases within the central database 74 will be explained in greater detail below. As will be readily understood by one skilled in the relevant art, the central database 74 may be one or more databases, which may be remote from one another. Additionally, it will be further understood that one or more of the databases 74 may be maintained outside of the central server 56.

With continued reference to FIG. 2, the central server 56 communicates with one or more notification acceptors 90. In an illustrative embodiment, the notification acceptors 90 include one or more authorized users. Each authorized user has a preference of notification means as well as rights to the raw and processed monitoring data. The authorized users include premises owners, security directors or administrators, on-site security guards, technicians, remote monitors (including certified and non-certified monitors), customer service representatives, emergency personnel and others. As will be readily understood by one skilled in the art, various user authorizations may be practiced with the present invention. Additionally, it will be further understood that one or more of the rules databases may be maintained outside of the central server.

In an illustrative embodiment of the present invention, the central server 56 communicates with the notification acceptors 90 utilizing various communication devices and communication mediums. The devices include personal computers, hand-held computing devices, wireless application protocol enabled wireless devices, cellular or digital telephones, digital pagers, and the like. Moreover, the central server 56 may communicate with these devices via the Internet 20 utilizing electronic messaging or Web access, via wireless transmissions utilizing the wireless application protocol, short message services, audio transmission, and the like. As will be readily understood by one skilled in the art, the specific implementation of the communication mediums may require additional or alternative components to be practiced. All are considered to be within the scope of practicing the present invention.

Generally described, the present invention facilitates the collection and processing of a variety of device information for distribution to one or more authorized users in a highly extensible manner. The system of the present invention obtains monitoring data from any one of a variety of monitoring devices 34. In an actual embodiment of the present invention, the monitoring device data is categorized as asset data, resource data or event data. Asset data is obtained from a monitoring device corresponding to an identifiable object that is not capable of independent action. For example, asset data includes data obtained from a bar code or transponder identifying a particular object, such as a computer, in a particular location. Resource data is obtained from a monitoring device corresponding to an identifiable object that is capable of independent action. For example, resource data includes data from a magnetic card reader that identifies a particular person who has entered the premises. Event data is obtained from a monitoring device corresponding to an on/off state that is not correlated to an identifiable object. Event data is a default category for all of the monitoring devices. As will be readily understood by one skilled in the relevant art, alternative data categorizations are considered to be within the scope of the present invention.

The monitoring device data is obtained by the monitoring devices 34 on the premises server 32 and transmitted to the central server 56. The central server 56 receives the monitoring device data and processes the data according to a rules-based decision support logic. In an actual embodiment of the present invention, the central server 56 maintains databases 74 having logic rules for asset data, resource data and event data. Moreover, because the monitoring device data is potentially applicable to more than one authorized user, multiple rules may be applied to the same monitoring device data. In an alternative embodiment, the rules databases 74 may be maintained in locations remote from the central server 56.

In the event the processing of the monitoring device rules indicates that action is required, the central server 56 generates one or more outputs associated with the rules. The outputs include communication with indicated notification acceptors 90 according to the monitoring device data rules. For example, an authorized user may indicate a hierarchy of communication mediums (such as pager, mobile telephone, land-line telephone) that should be utilized in attempting to contact the user. The rules may also indicate contingency contacts in the event the authorized user cannot be contacted. Additionally, the rules may limit the type and/or amount of data to which the user is allowed to access. Furthermore, the outputs can include the initiation of actions by the central server 56 in response to the processing of the rules.

Figure 5:
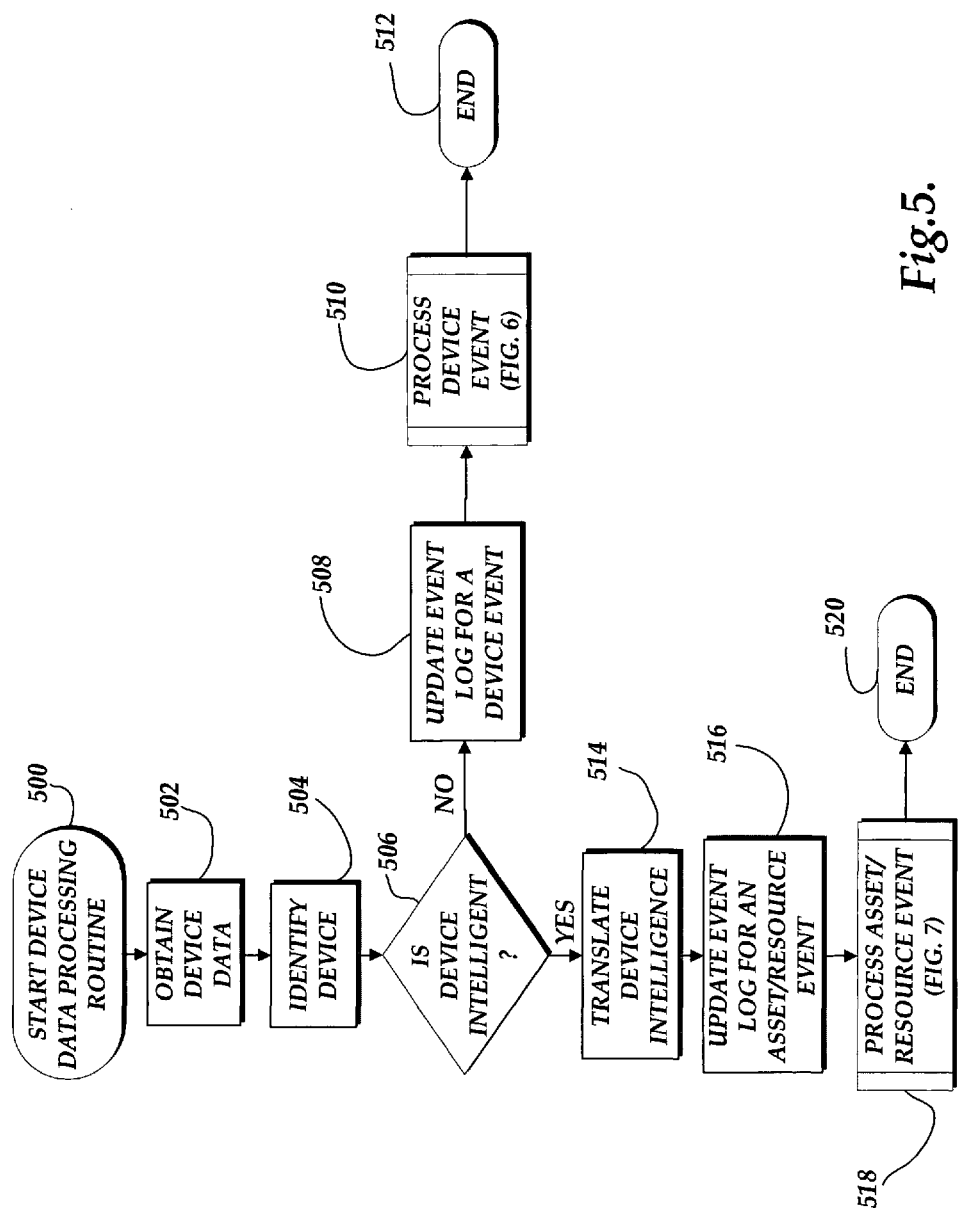
FIG. 5 is a flow diagram illustrative of a monitoring device data processing routine in accordance with the present invention.

FIG. 5 is a flow diagram illustrative of a device decision support process support routine 500 for processing the monitoring device data in accordance with the present invention. At block 502, the central server 56 obtains an input from a monitoring device. In an actual embodiment of the present invention, the input is obtained from the premises server 32. Alternatively, the input may be received directly from the monitoring device 34 or the central server 56 may poll individual devices (or the premises server 32) for an input. At block 504, the central server 56 identifies the device processing the data. The identification may be accomplished by determining a network address from which the input originated and which is assigned to the specific devices, or by reading other identification data that can be included with the data input.

At decision block 506, a test is performed to determine whether the device data includes intelligence data. In an actual embodiment of the present invention, the intelligence data includes data that characterizes the data as asset data or resource data, because the data contains information identifying the object. In contrast, data that does not contain any information identifying an object and is not considered intelligent. If the device is not determined to be intelligent or if the device cannot be identified, at block 508, an event log database 76 is updated to reflect the input data. At block 510, the central server 56 processes the data according to a process device event subroutine. The routine 500 terminates at block 512.

Figure 6:
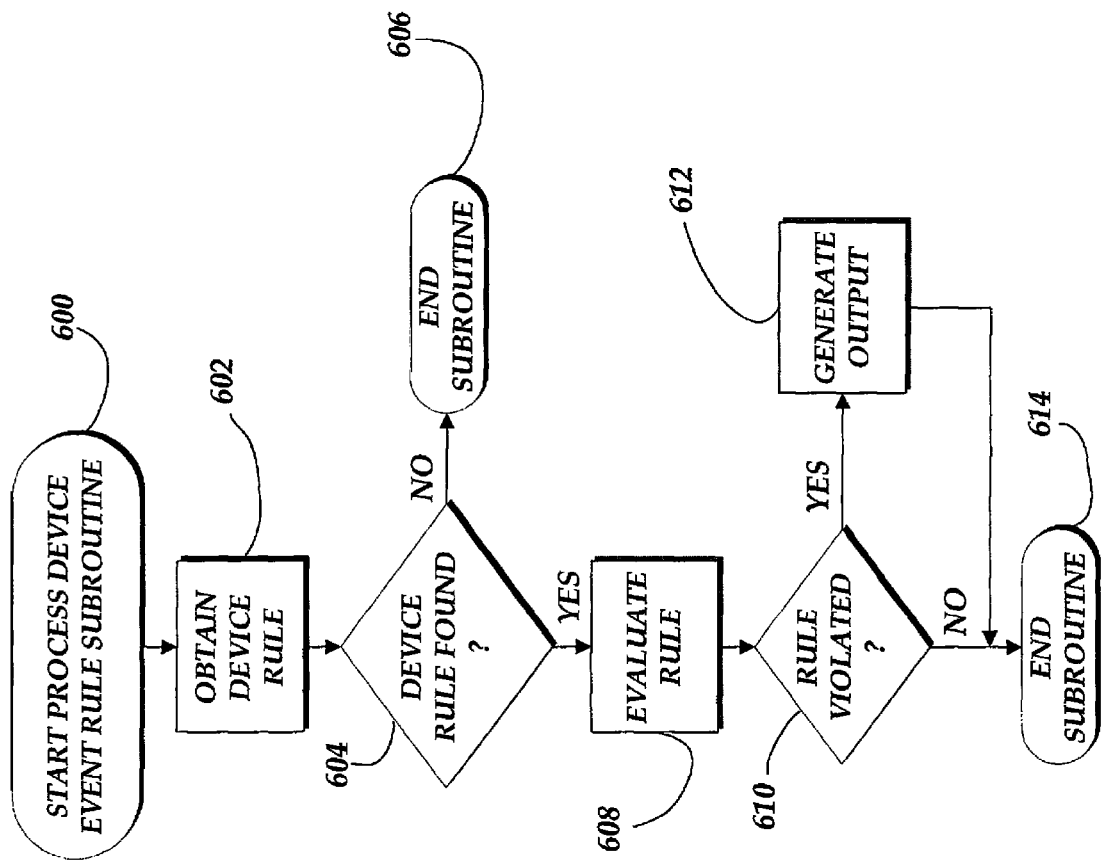
FIG. 6 is a flow diagram illustrative of a device event processing subroutine in accordance with the present invention.

FIG. 6 is a flow diagram illustrative of a process device event subroutine 600 in accordance with the present invention. At block 602, the central server 56 obtains the monitoring device rules. In an actual embodiment, the monitoring device rules are stored in a database 86 in communication with the central server 56. The rules contain data indicating one or more ranges for determining a rule violation. In a broad sense, a rule violation is an indication of an event occurrence for which a notification is required. The ranges correspond to the type of data produced by the monitoring device. For example, if a monitoring device 34 is capable of only two stages (e.g., on or off), the rule may indicate that existence of one stage, e.g. "on", is a violation. The rules may also include an indication that one or more monitoring device rules must also be considered before the rule is determined to be violated. For example, a rule corresponding to a glass break detector may indicate that a motion detector signal must be detected before the rule is violated. As will be readily understood by one skilled in the relevant art, additional or alternative rule types are considered to be within the scope of the present invention.

At decision block 604 a test is performed to determine whether a device rule is found. If no rule is found, the process terminates at block 606. If, however, a device rule is found, at block 608 the central server 56 evaluates the rule according to the data received from the monitoring device 34. In an illustrative embodiment, the rules may include preset or default rules maintained by the central server 56. Additionally, the rules may include independently created rules by one or more authorized users. Moreover, one or more authorized users may be given the authority to modify or update rules via a user interface.

At decision block 610, a test is performed to determine whether the device rule is violated. If the rule is violated, at block 612, the central server 56 creates a rule violation output. In an actual embodiment of the present invention, the rules violation output instructions are included in the rule. The instructions include a list of the authorized users to notify in the event of a rule violation and a hierarchy of which communication medium and devices should be utilized to contact each authorized user. For example, the rules may be in the form of logical if/then statements implementing an iterative hierarchy for establishing communication with an authorized user. Moreover, the instructions may also indicate the extent of the data that that authorized user has access to. For example, the output may include the generation of a call to the premises owner's mobile device, the paging of an on-site monitor and a land-line telephone call to the public authorities. Alternatively, the central server may also maintain an output database indicating the output instructions corresponding to each rule.

In an illustrative embodiment of the present invention, the communication from the central server 56 may be to a wireless computing device, such as a personal digital assistant, or mobile phone. In accordance with this aspect of the present invention, the central server 56 maintains an output server for generating output to a wireless device. In an illustrative embodiment of the present invention, the output server would include a database for formatting the output to the specific requirements of a device selected by the notification acceptor 90. Alternatively, the output server may also maintain a standard image including a minimum set of display characteristics that match most mobile computing device displays.

In another illustrative embodiment of the present invention, the rules violation output may be in the form of an output over a telecommunications or IP network. Moreover, in the event the notification acceptor 90 request an audible notification, text to speech components may be utilized to translate electronic data into an audible form. Accordingly, because the notification hierarchy may specify one or more notifications, the same electronic data is processed to allow for display by a first device and an audible play by a second device.

In addition to generating communications, the rules violation output may also instigate an integrated system response. For example, in the case of an intrusion, a dye may be sprayed on the intruder from an aerosol sprayer. Additionally, the system may sound an audible alarm and directly dial emergency personnel. In another example, if the system rules violation is a medical emergency, the central server 56 may call an ambulance, turn on lights within the premises, and unlock the doors to facilitate entry by the emergency personnel.

Once the central server 56 has generated the rules violation output at block 612 or if the event rule is not violated at block 610, the subroutine 600 terminates at block 614.

Returning to FIG. 5, if at block 506, the device data includes intelligence information, at block 514, the intelligence is translated from the monitoring device data. At block 516, the log event database 76 is updated to reflect the input data. At block 518, the central server 56 processes the data according to a process asset/resource event subroutine. The routine 500 terminates at block 520.

Figure 7A:
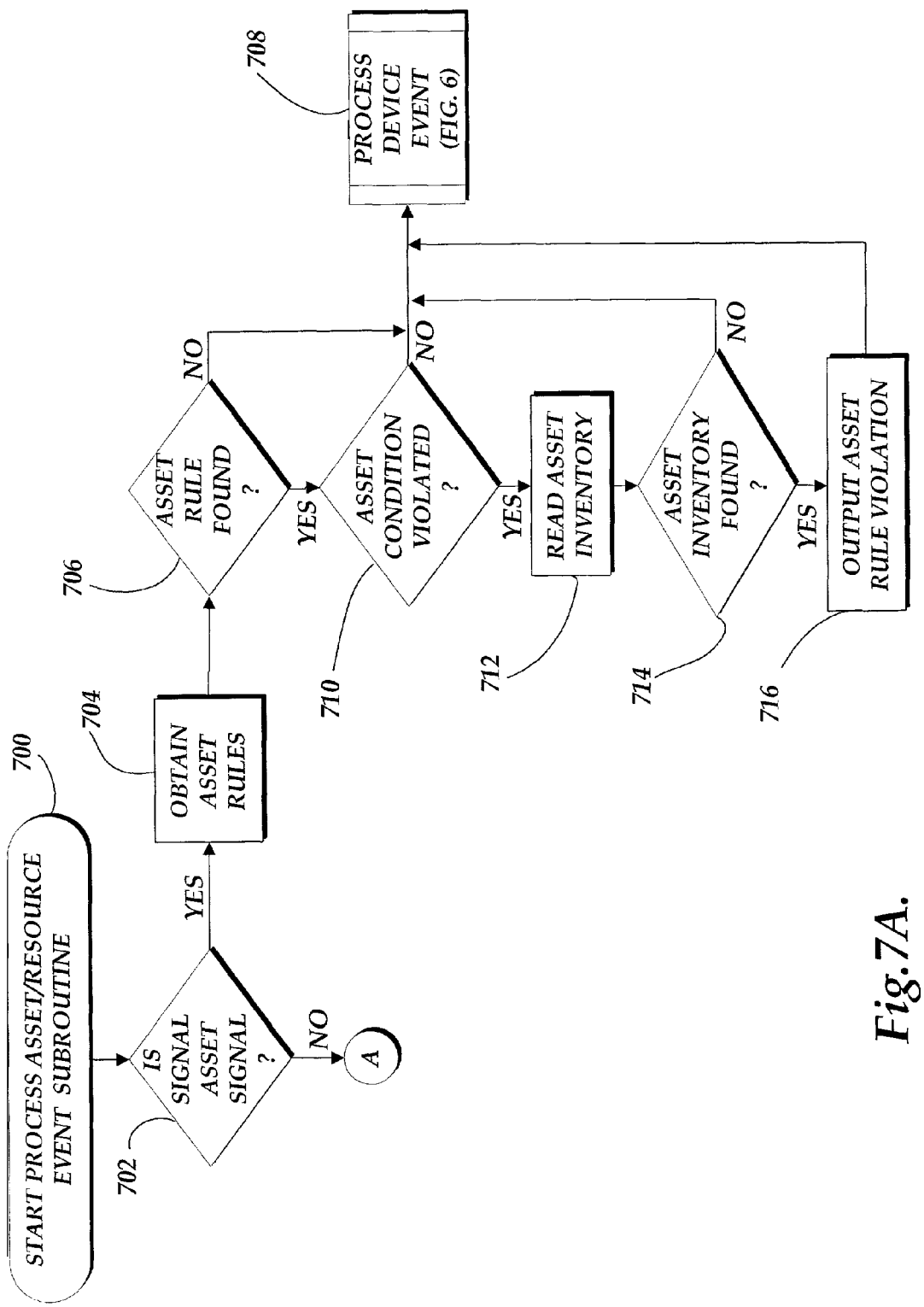
FIGS. 7A and 7B are flow diagrams illustrating an asset/resource event processing subroutine in accordance with the present invention.
Figure 7B:
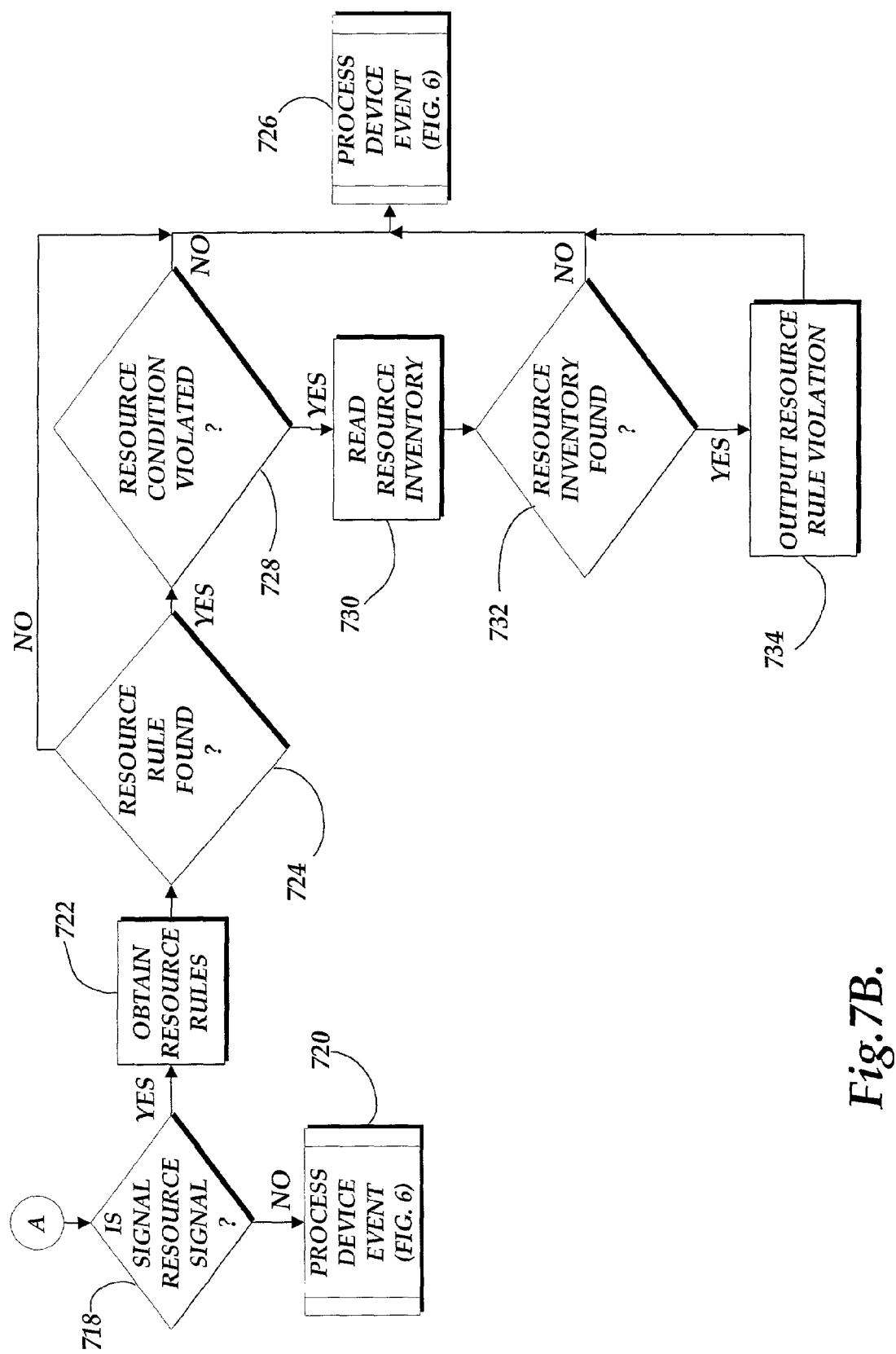

FIGS. 7A and 7B are flow diagrams illustrative of a process asset or resource event subroutine 700 in accordance with the present invention. With reference to FIG. 7A, at decision block 702, a test is performed to determine whether the input signal is asset data. If the signal is identified as asset data, at block 704, the asset rules are obtained. In an actual embodiment of the present invention, the asset rules are maintained and retrieved from an asset rules database 78. At block 706, a test is performed to determine whether an asset rule is found. If no asset rule is found for the asset, the monitoring device data is processed as a device event at block 708. In an actual application of the present invention, the device event is processed as described above with respect to the device event processing subroutine 600 (FIG. 6). In an illustrative embodiment of the present application, in the event the asset rule processing cannot be completed, the monitoring device is still processed as a device-level event.

If an asset rule is found, at decision block 710, a test is performed to determine whether the asset rule is violated. In an actual embodiment of the present invention, the asset rule contains data allowing the central server 56 to determine a rule violation. For example, an asset rule may contain information indicating a requirement of a particular object (e.g., a computer) performing an action (e.g., logged into a network) for a violation. Additionally, the asset rule may indicate that additional device, resource or asset rules may be considered prior to determining whether the rule has been violated. As explained above, the rules may include preset rules maintained by the central server and user implemented/modified rules.

If the rule has not been violated, the monitoring device data is processed as a device event at block 708. It will be generally understood by one skilled in the relevant art, that processing the rule as a both an asset and a device event allows for multiple purpose processing of the monitoring device data, such as the detection of a specific object and the detection of an object.

If the asset rule has been violated, at block 712, the central server 56 reads a known asset inventory to identify the asset. In an actual embodiment of the present invention, central server maintains and reads from an asset inventory database 82. At decision block 714, a test is performed to determine whether the asset is found in the asset inventory. If the asset is not found, the system defaults to processing the monitoring device data as a device event at block 708. If the asset is found in the asset inventory, at block 716, central server 56 outputs the asset violation. In an actual embodiment of the present invention, the asset rule contains instructions for generating output in the event of a rule violation to one or more authorized users. The instructions also contain a hierarchy of communication mediums and communication devices to attempt to contact the authorized user. Additionally, the instructions may contain alternative contact personnel if central server cannot contact the authorized user. Moreover, as explained above, the output may also instigate action by the integrated system. At block 708, the monitoring device data is processed as a device event.

With reference to FIG. 7B, if the signal is not determined to be asset data at block 702 (FIG. 7A), at decision block 718, a test is done to determine whether the inputted signal is resource data. If the signal is not identified as resource data, at block 720, the monitoring device data is processed as a device event. In an actual application of the present invention, the device event is processed as described above with respect to the device event processing subroutine 600 (FIG. 6). If the signal is identified as resource data, at block 722, the resource rules are obtained. In an actual embodiment of the present invention, the resource rules are maintained and retrieved from a resource rules database 80. At block 724, a test is performed to determine whether a resource rule is found. If no resource rule is found for the resource, the monitoring device data is processed as a device event at block 726.

If a resource rule is found, at decision block 728, a test is performed to determine whether the resource rule is violated. In an actual embodiment of the present invention, the resource rule contains data allowing the central server to determine a rule violation. Additionally, the resource rule may indicate that additional device, resource or asset rules may be considered prior to determining whether the rule has been violated. If the rule has not been violated, at block 726, the monitoring device data is processed as a device event. It will be generally understood by one skilled in the relevant art, that processing the rule as a both a resource and a device event allows for multiple purpose processing of the monitoring device data.

If the resource rule has been violated, at block 730, the central server 56 reads a known resource inventory to identify the resource. In an actual embodiment of the present invention, central server 56 maintains and reads from a resource inventory database 84. At decision block 732, a test is performed to determine whether the resource is found in the resource inventory. If the resource is not found, the system defaults to processing the monitoring device data as a device event at block 726. If the resource is found in the resource inventory, at block 734, central server 56 outputs the resource violation. In an actual embodiment of the present invention, the resource rule contains instructions for generating output in the event of a rule violation to one or more authorized users. The instructions also contain a hierarchy of communication mediums and communication devices to attempt to contact the authorized user. Additionally, the instructions may contain alternative contact personnel if central server 56 cannot contact the authorized user. Moreover, as explained above, the output may also instigate action by the integrated system. At block 726, the monitoring device data is processed as a device event.

Figure 8:
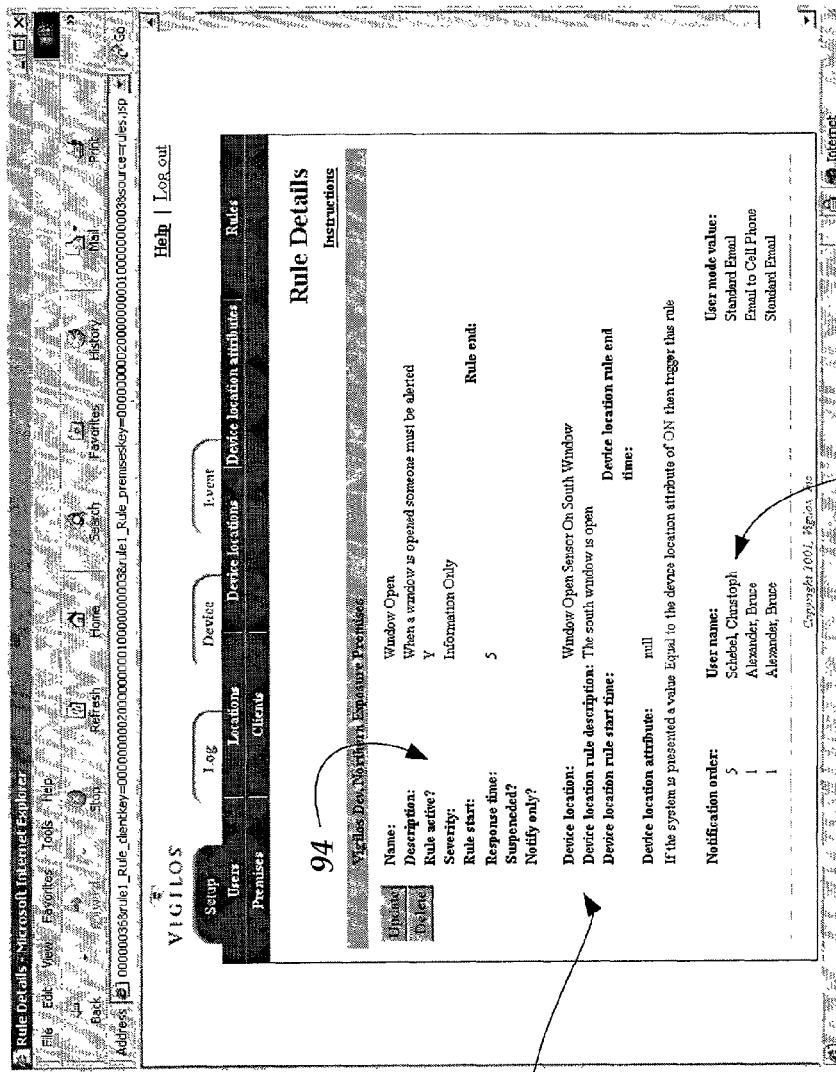
FIG. 8 is illustrative of a screen display produced by a WWW browser enabling a user to review a monitoring device rule in accordance with the present invention.
Figure 9:
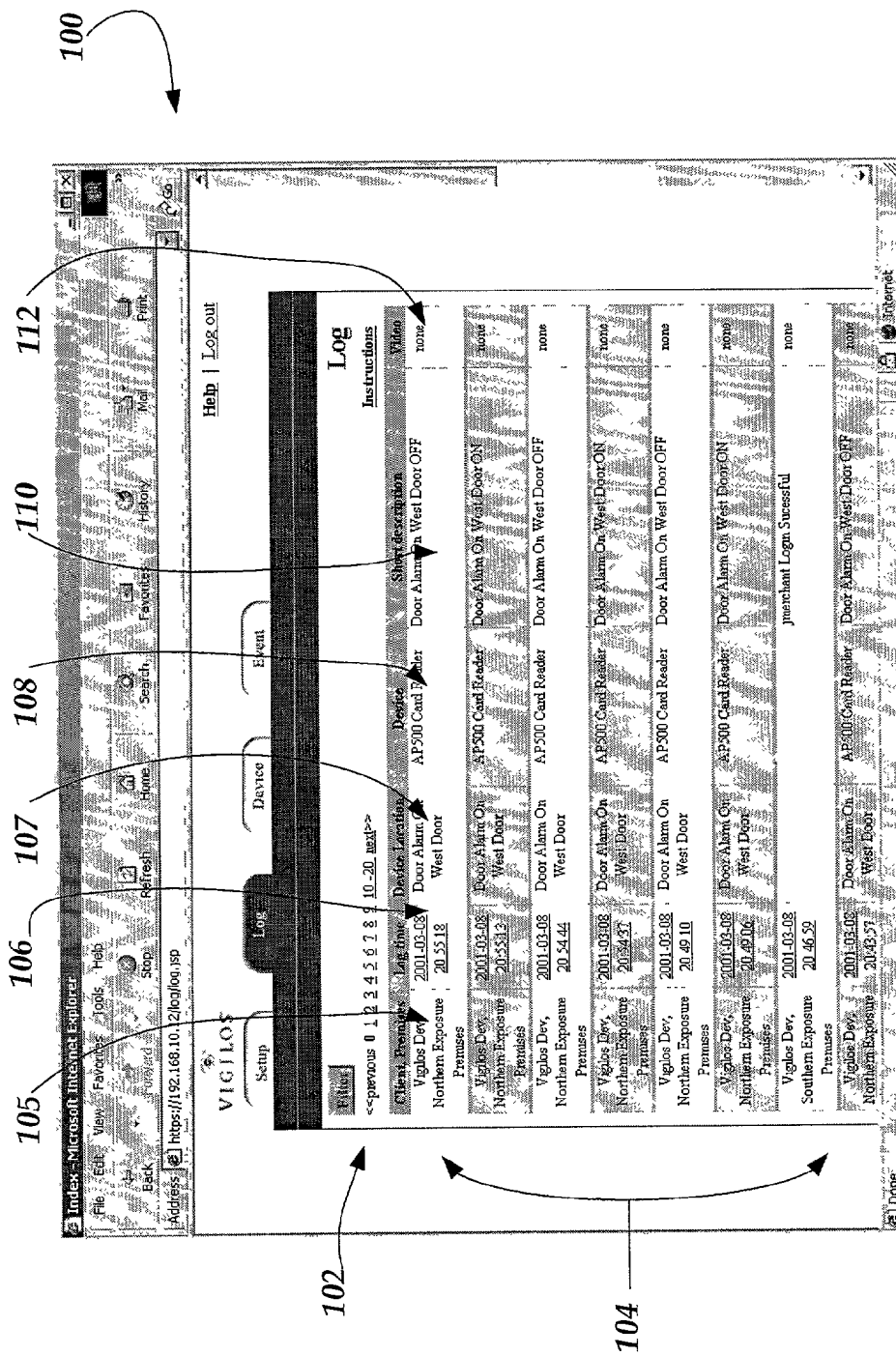
FIG. 9 is illustrative of a screen display produced by a WWW browser enabling a user to review integrated information system data logs in accordance with the present invention.
Figure 10:
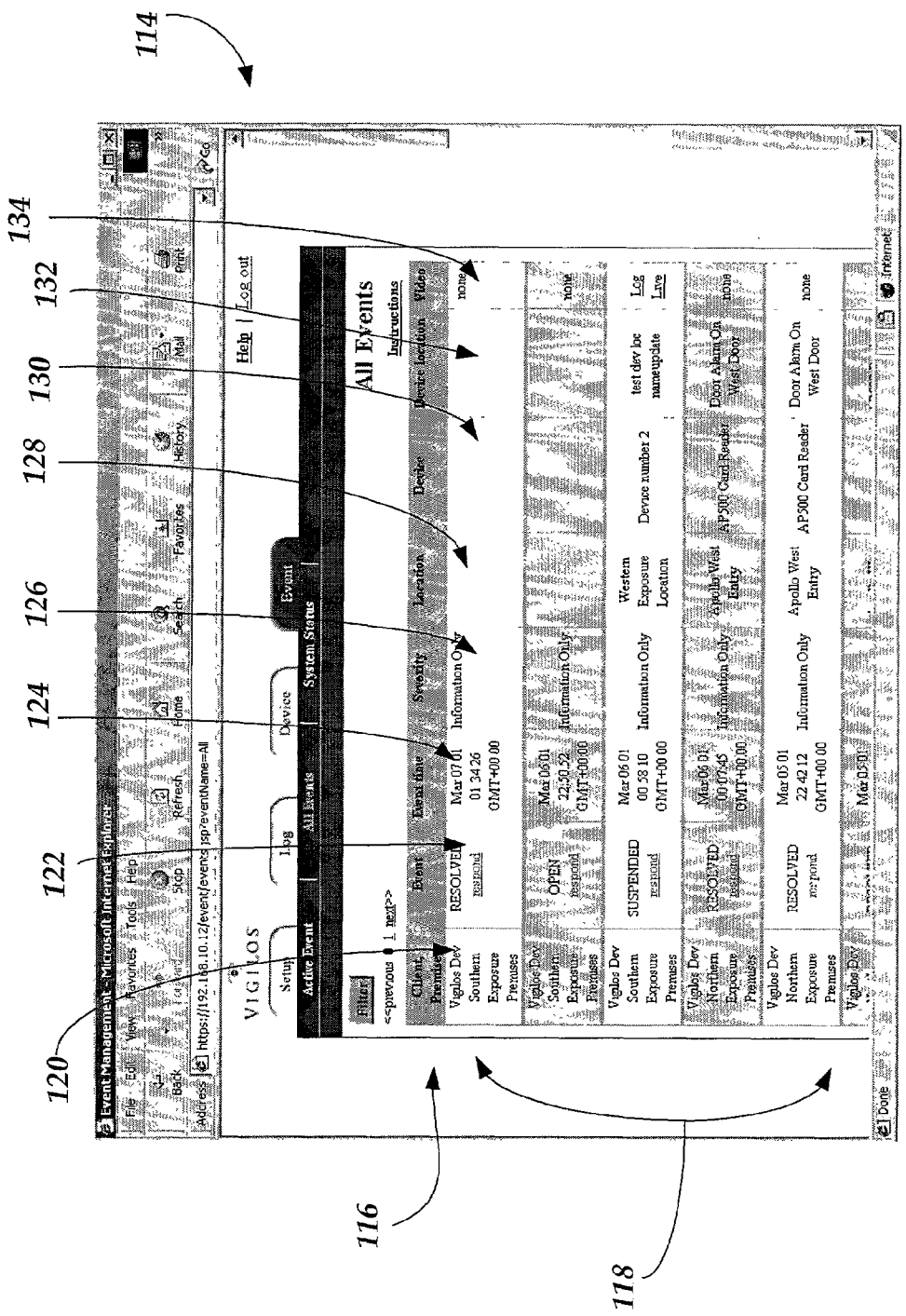
FIG. 10 is an exemplary user interface screen display illustrating a message management interface in accordance with the present invention.

FIGS. 8, 9, and 10 are exemplary screen displays illustrative of various user interfaces relating to various aspects of the integrated information system 10 of the present invention. In an illustrative embodiment of the present invention, the various user interfaces allows an authorized system user to perform a variety of tasks associated with the integrated information system 10 including, but not limited to, installing new monitoring devices 34 or output devices 36, generating or modifying device, asset and resources rules, and/or reviewing collected data. One skilled in the relevant art will appreciate that a variety of user interfaces may be utilized in conjunction with the present invention and that the disclosed embodiments are illustrative and should not be construed as limiting.

In an actual embodiment of the present invention, portions of a user interface with the integrated information system 30 are displayed remotely from one or more of the servers. For example, an authorized user, such as the premises owner, may be available to view an event violation remotely through the use of a standard Internet Web browser based connection. In another embodiment, a remote monitoring service may be given access to control one or more of the monitoring devices 34 via a Web browser based connection or via a direct communication line. Still further, security personnel may review real time monitoring device 34 data via a wireless communication device. Accordingly, the user interface provided to the authorized user may conform to the function being performed, the limits of a device, or the communication medium transmitting the data.

FIG. 8 is illustrative of a screen display 92 produced by a WWW browser enabling a user to review a monitoring device rule in accordance with the present invention. As illustrated in FIG. 8, the screen display 92 includes a field 94 for identifying a name for the rule, one or more fields 96 identifying rule attributes, and one or more fields 98 identifying the notification attributes in the event there is a rule violation. In an actual embodiment of the present invention, an authorized user may review the rule detail, and may also modify or create new rules by completing the associated fields.

FIG. 9 is illustrative of a screen display 100 produced by a WWW browser enabling a user to review integrated information system 10 data logs in accordance with the present invention. In an actual embodiment of the present invention, the integrated information system 30 may keep a central log for all event, device and resource violations. As illustrated in FIG. 9, the screen display 100 provides the user with a table 102 of all rules violation data collected by the integrated information system 10. In the illustrative embodiment of the present invention, the table 102 includes a variety of records 104 that include a premises identifier field 105, a time stamp field 106, a device location field 107, a monitoring device 34 identifier field 108, a data descriptor field 110, and an indication 112 of whether the data includes video data. In an actual embodiment of the present invention, an authorized user can filter through the event log by specify searching criteria. Additionally, the authorized user may view more detailed information about specific records 104 by manipulating a peripheral graphical device interface tool, such as a mouse or by using a touchscreen interface. One skilled in the relevant art will appreciate that the event log table 102 may be modified to include additional or less fields.

FIG. 10 is illustrative of a screen display 114 produced by a WWW browser enabling a user to review integrated information system 10 event data logs in accordance with the present invention. In addition to the table 102 of all rules violation, the integrated information system 30 may also maintain specific tables of event rule violations, device rule violations and resource rules violations. The screen display 114 illustrated in FIG. 10 includes a table 116 of all event rules violation data. The table 116 is defined by a variety of records 118 that are defined by a client premises location field 120, an event status field 122, a time stamp field 124, an event severity field 126, an event location field 128, a device identifier field 130, a device location field 132 and a video data present field 134. Similar to the screen display 100, in an actual embodiment of the present invention, an authorized user is able to filter event data and also obtain greater detail. In an actual embodiment of the present invention, in which the screen display format is a portable digital processing device such as a personal digital assistant ("PDA") a user may access a PDA-specific Web site to obtain event data or other device-related data that is sized according to the processing and display capabilities of the device. In such a use, a user would have registered the device with the Web site so that the resulting data may be sized to the processing and display capabilities of the particular device. One skilled in the relevant art will appreciate that various screen display formats may be utilized with the present invention.

In an illustrative embodiment of the present invention, the method and system of the present invention are implemented in the form of a network access verification embodiment. One skilled in the relevant art will appreciate that access to computer networks is commonly controlled by a combination of a user identifier and one or more passwords. Generally described, network access verification devices on public networks, such as the Internet 20, can be subject to concerted attempts to gain access to a restricted network and/or confidential information. In the event a password/identifier is compromised, there is a need for identifying such a compromise in a timely manner and to terminate the unauthorized access as soon as possible.

Figure 11:
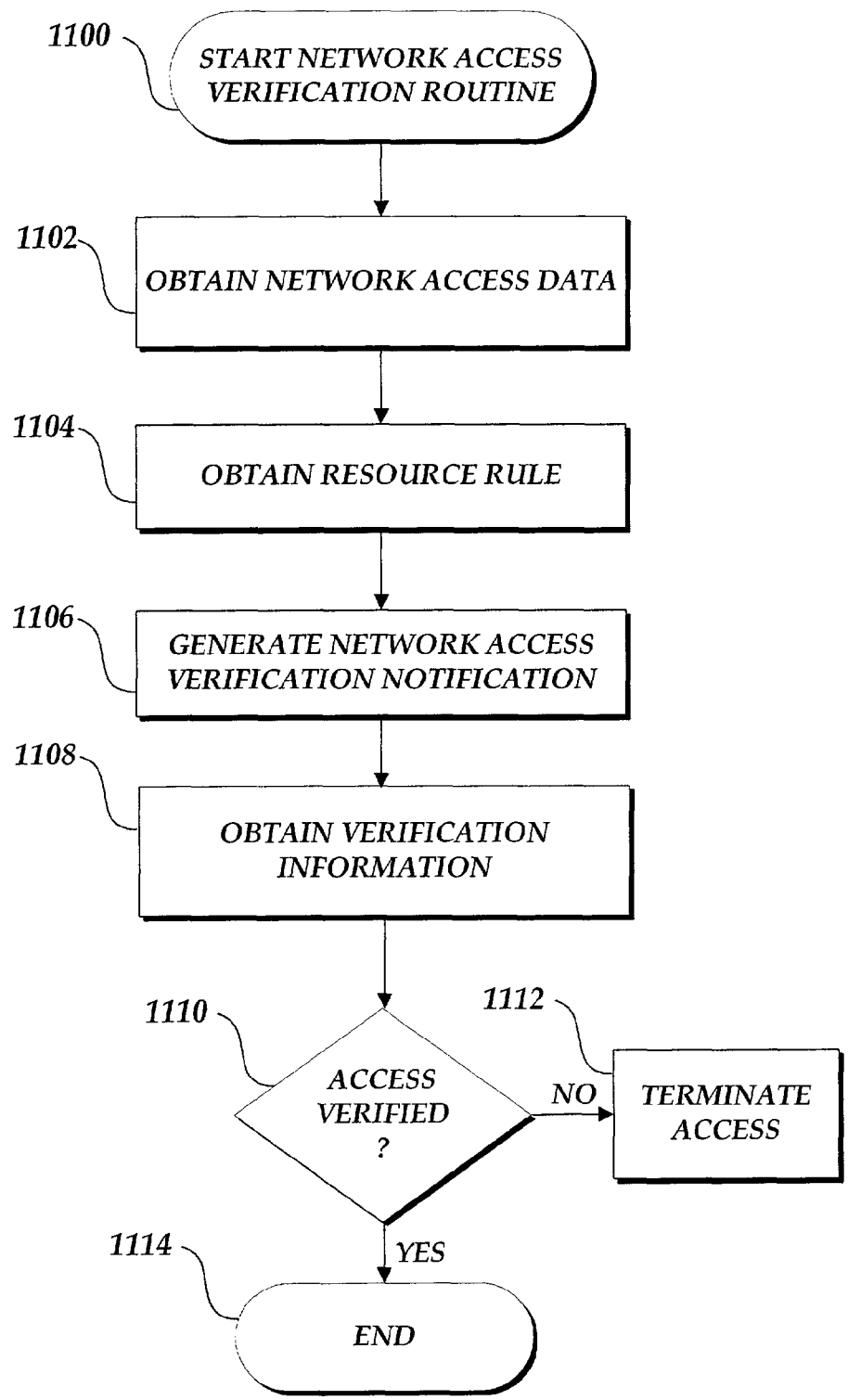
FIG. 11 is a flow diagram illustrative of a network access verification routine in accordance with the present invention.

In accordance with an aspect of the present invention, the integrated information system 30 may be utilized in a network access verification configuration. FIG. 11 is a block diagram illustrative of a network access verification routine 1100 in accordance with the present invention. At block 1102, a monitoring device 34 obtains network access information. In an actual embodiment of the present invention, the integrated information system 30 includes at least one monitoring device 34 that generates resource data identifying a particular user identification attempting to log in to a monitored computer network. Additionally, the integrated information system 30 may also include alternative devices for accessing a network, such as a smart card, badge, facial recognition, voice identification, or other transponder or biometric identification devices. Additionally, the monitoring device 34 may obtain information relating to a device corresponding to an individual attempting to gain access to a wireless network. The premises server 32 obtains the monitoring device data and transmits it to the central server 56.

At block 1104, the central server 56 obtains a resource rule corresponding to a user identification from the resource rules database 80. In an illustrative embodiment of the present invention, the resource rule corresponding to the network access device will include a notification sequence to be followed if a login corresponding to the use is detected. In an actual embodiment of the present invention, at the time a user is given a user identifier and password, the user also selects a preferred notification method. For example, the user may be presented with a list of available notification methods including, but not limited to call to a mobile device, email, call to a land line, and the like. The user selects one or more notification methods and enters the appropriate method.

At block 1106, the central server 56 generates a network access verification message to the user corresponding to the network access verification resource data. In an illustrative embodiment of the present invention, the network access verification message is transmitted according to preferences selected by the user. The message includes sufficient information to inform the user of an access to the network under their personal identifier. Additionally, the message also can include a manner to respond to the message. For example, if the user has selected notification by a telephone call, the message may be in the form of "Your personal identifier to the "X" network has been activated. Press # to continue, Press * to terminate access."

At block 1108, the central server 56 obtains verification from the user. With reference to the above-mentioned example, the user may transmit verification by pressing a particular key of a touch pad. Additionally, the user may be required to place a telephone call or other audio message to a processing center. Still further, the user may receive a personal identification number that will be entered to gain access to the network. One skilled in the relevant art will appreciate that the user may utilize any one of a number of communication methods/mediums to verify the network. Moreover, the user does not necessarily have to utilize the same communication method/medium that was utilized to provide the user with the notification. At decision block 1110, the central server 56 performs a test to determine whether the network access has been verified by the user. If the network access has not been verified, at block 1112, the central server 56 generates an output that terminates the network access. Additionally, the central server 56 may also generate notifications to the authorized user and/or security personnel.

In another illustrative embodiment of the present invention, the integrated information system 30 may be utilized to mitigate the unauthorized distribution of private information. This embodiment is similar to the network access verification routine 1100 in which a user would enter a preferred notification method in the event private information, such as a financial institution bank card, is being utilized. Accordingly, if the integrated information system 30 is in communication with the financial institution, the resource rule database 80 may dictate that the authorized user be notified by a selected method before approving a transaction, or alternatively, before approving a transaction over a specified amount.

In accordance with another illustrative embodiment of the present invention, the method and system of the present invention are implemented in the form of a video tracking embodiment. One skilled in the relevant art will appreciate that bar codes on a variety of mobile objects, such as packages, facilitate the identification and tracking of the movement of the object. Nevertheless, there is often a need for generating an accurate record of the movement of the object within a facility/premises. Additionally, there is a further need to monitor the movement of objects within a monitored area to mitigate the unauthorized movement of objects.

Figure 12:
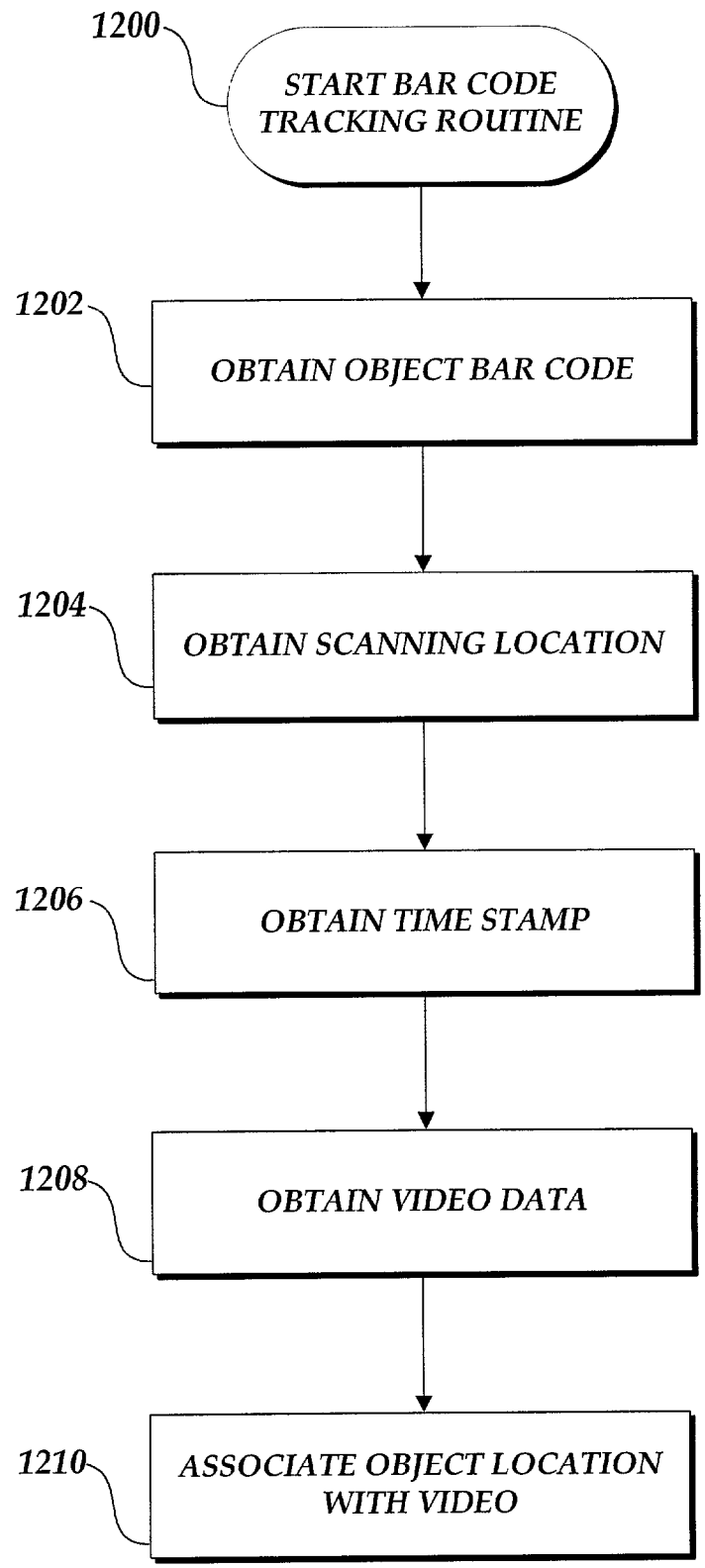
FIG. 12 is a flow diagram illustrative of a bar code tracking routine in accordance with the present invention.

In accordance with this aspect of the present invention, the integrated information system 30 is utilized in a bar code tracking configuration. In accordance with this embodiment, a video record is created for objects tracked with an identifier, such as a bar code, to allow for verification of the location and path of travel for the object. Although the embodiment is described in relation to a bar code, alternative identities such as radio signal emitting devices, holograms, symbols, and the like may be used. FIG. 12 is a flow diagram illustrative of a bar code tracking routine 1200 in accordance with the present invention. At block 1202, the central server 56 obtains an object bar code. In an illustrative embodiment of the present invention, conventional bar coding method, such as code 3 of 9, are utilized to generate the appropriate bar code images on the packages. The bar code is read from the package utilizing a bar code reader located in an area accessible to a video monitoring device and connected to the integrated information network 30 as a monitoring device 34.

At block 1204, the central server 56 obtains scanning location information from the particular bar code scanning computing device. In an illustrative embodiment of the present invention, each bar code scanning computing device is associated with a particular area within the monitored facility. Accordingly, the central server 56 identifies the location of the bar code scanner by identifying a port number assigned to the area. Alternatively, in the event that bar code scanner is mobile, a second bar code identifying a particular area may be read and transmitted to the central server 56. Still further, the bar code scanner may also have data entry capabilities allowing a user to designate a particular area.

At block 1206, the central server 56 obtains time information corresponding to the acquired bar code information. In an illustrative embodiment of the present invention, the central server 56 includes a clock component that serves as a timing standard for all inputted data. At block 1208, the central server 56 obtains data archived from a video camera monitoring device 34 corresponding to the area associated with the bar code reader. In an illustrative embodiment of the present invention, the central server 56 maintains archived data from video monitoring device in a manner that facilitates the retrieval of time sensitive data. A more detailed explanation of a data archiving method is disclosed in commonly assigned U.S. patent application Ser. No. 10/007,136, entitled SYSTEM AND METHOD FOR PROCESSING VIDEO DATA UTILIZING MOTION DETECTION AND SUBDIVIDED VIDEO FIELD, filed Dec. 3, 2001, the disclosure of which is incorporated herein by reference.

At block 1210, the video data is associated with the bar code data to create a video record of the movement of the object. In an illustrative embodiment of the present invention, a frame grabber within the central server 56 stores as one or more frames of the digital video data associated with the time the bar code was obtained. Additionally, the central server may also insert an object identifier in the archived video data to identify at which time the object was detected. In this embodiment, if the archive video includes a time counter, the central server 56 may insert an identifier, such as a symbol, to facilitate later review. A more detailed explanation of a video marking method is disclosed in commonly assigned U.S. patent application Ser. No. 09/966,814, filed Apr. 3, 2001, entitled SYSTEM AND METHOD FOR IMPLEMENTING DYNAMIC INTERACTION WITH REMOTE DEVICES, to Alexander et al., which is incorporated by reference herein.

One skilled in the relevant art will appreciate that the above-described embodiment may be also utilized in conjunction with alternative identification methods/objects including, but not limited to, radio transponders, smart cards, infrared identification devices, or other resource identifiers.

Figure 13:
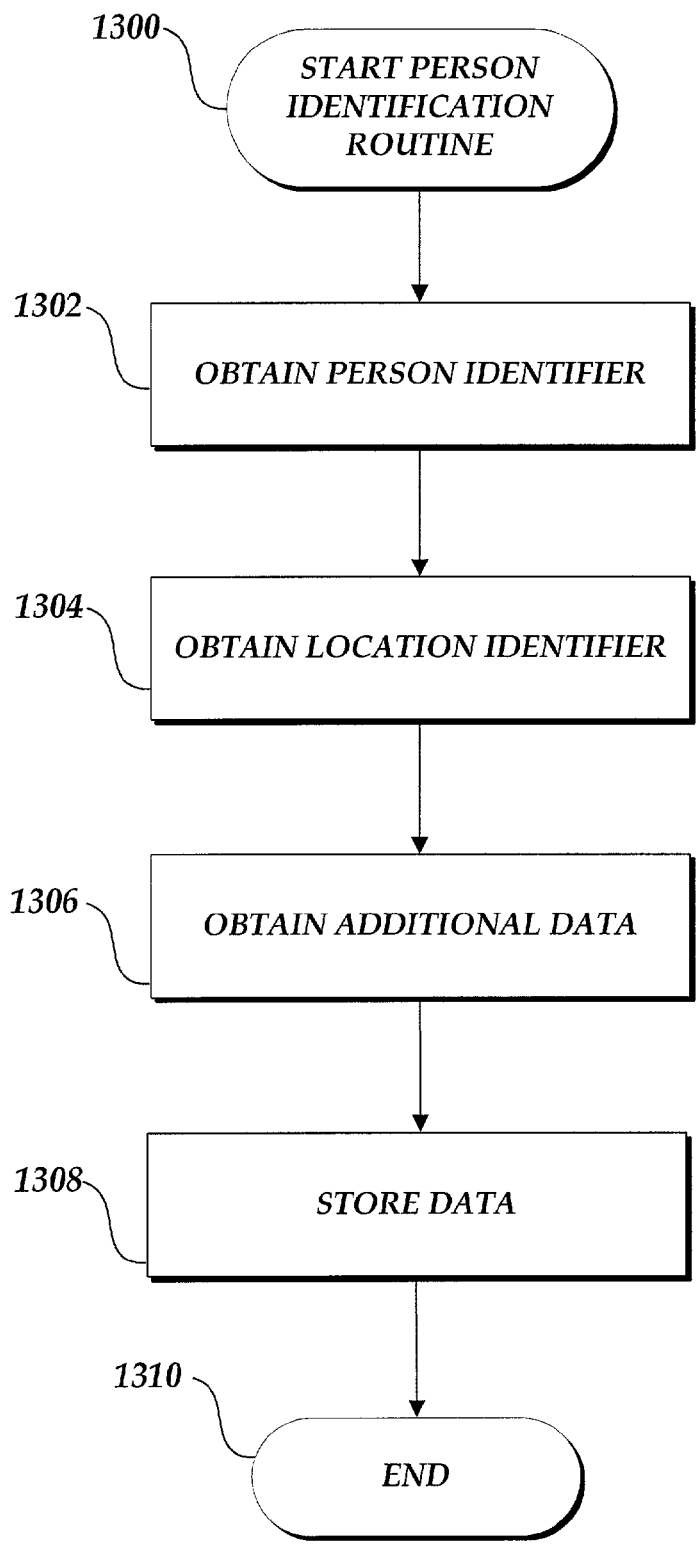
FIG. 13 is a flow diagram illustrative of a asset identification routine in accordance with the present invention.

In another illustrative embodiment of the present invention, the integrated information system 30 is implemented in a personnel location identifier embodiment. In accordance with this illustrative embodiment, the integrated information system 30 associates the current location of a person on a monitored facility with location, time and/or video data to generate a record of the person's movement within the facility. FIG. 13 is a flow diagram illustrative of a location identification routine 1300 in accordance with the present invention.

With reference to FIG. 13, at block 1302, the central server 56 obtains an individual or asset identifier. In an illustrative embodiment of the present invention, the central server 56 may obtain the individual or asset identifier, by placing a variety of bar code scanning monitoring devices 34, or other identification devices, through various places in the monitored facility. Thus, an asset such as person or a laptop computer, moving or being moved throughout the premises scans a bar code information with the individual or asset, such as on a security badge having a bar code thereon or an adhered barcode on a laptop, the central system 56 obtains the individual's or asset's identification through the bar code scanning monitoring device 34.

In another illustrative embodiment, the integrated information system 30 includes one or more kiosk monitoring devices 34 that are located throughout the monitored premises. Accordingly, to transmit the identity of an individual or asset to the central server 56, the kiosk could include input instruments, such as keypads, a computer mouse, a magnetic card reader and the like to obtain an input from the particular user. The kiosk monitoring device would then transmit the identity to the central server 56.

In yet another embodiment, a user may be assigned a unique device that includes an identifier signal. For example, each user may be given a particular radio frequency emitting unit that is associated with that person. Accordingly, a corresponding monitoring device 34 picks up the unique signal and transmits the signal to the central server for associating the signal with a person. One skilled in the relevant art will appreciate that additional or alternative identification devices/methods, including, but not limited to, biometric identification devices (voiceprints, fingerprints, eyes scans), motion sensors, pressure sensitive floor mats, and the like may be utilized by the present invention to detect the presence of an individual or group of individuals.

At block 1304, the central server 56 obtains a geographic location identifier. One skilled in the relevant art will appreciate that a variety of location identifier devices/methods may also be utilized in conjunction with the present invention. Moreover, the location identification device/method may correspond with the person identification device/method utilized in block 1302. For example, in one illustrative embodiment, a monitoring device 34, such as a bar code scanner, may be fixed to a particular geographic region. Accordingly, an individual or asset identifier input, would be associated with the assigned geographic region of the monitoring device. In another illustrative embodiment, the a user interface within a monitoring device 34 may also allow the user to designate particular geographic regions or sub-regions via an interface, such as a graphic user interface map.

At block 1306, the central server 56 obtains any additional monitoring device 34 data that may be desirable to associate with the user input. In an illustrative embodiment of the present invention, the central server 56 may obtain a time stamp from a central server 56 clock to include a time stamp with the data. In another illustrative embodiment, the central server 56 may also obtain video monitoring device data from a video camera in the geographic region to create a record confirming the presence of the individual or asset identified.

At block 1308, the central server 56 saves the associated data in a file for archiving. In an illustrative embodiment of the present invention, the central server 56 may utilize a frame grabber to generate a still frame of the video data verifying the user's presence. Additionally, the central server 56 may generated a printed report identifying the transmitted data. At block 1310, the routine 1300 terminates. In another embodiment of the present invention, the central server 56 may also process the inputted data according to one processing rules as described above.

In a further embodiment of the present invention, the integrated information system 30 is implemented in an enterprise access control configuration. One skilled in the relevant art will appreciate that security access systems for monitoring a specific area may have individual security access routines. For example, security access to a first area may be accomplished by a first password, while security access to second area may be accomplished with a different security system requiring a second password. Accordingly, the conventional systems are deficient in lacking coordination over multiple security access systems in multiple areas.

In accordance with this illustrative embodiment, the integrated information system 30 is configured to provide universal security access information and control processes. In accordance with this aspect of the present invention, the integrated information system 30 includes multiple security access monitoring devices 34 located in various areas of a monitored premises or on different premises. The security access monitoring devices 34 may have a similar function and manufacturer, or alternatively, may have different or additional functions. Irrespective of the type of access control, each monitoring devices includes a data input portion that allows an authorized user to input a security access data.

As explained above, the monitoring device 34 accepts the access data and transmits it to the central server 56 as resource data. Accordingly, the central server 56 evaluates a resource rule to determine whether the particular user is cleared to have access to the area associated with the monitoring device. If evaluation of the rule indicates that access is appropriate, the central server 34 may activate an output device 36 associated with the area to provide security access. The central server 56 may also log in the entrance. If the evaluation of the rule does not indicated that access is appropriate, the central server 34 may not activate the output device 36 that grants access and may also activate an output device 36 that alerts an authorized user of the attempted access.

The universal access embodiment of the present invention can be embodied as a separate account security layer that may be remote from the access device. Additionally, the embodiment facilitates a change to the access data that can be implemented globally across multiple premises and/or security access monitoring devices 34.

In still a further embodiment of the present invention, the integrated information system 30 is implemented to utilize a packet burst data transmission method. In accordance with this aspect of the present invention, a data packet transmission structure and method may be utilized to deliver data between one or more components of the integrated information system. In accordance with an actual embodiment of the present invention, each data packet includes four sections. A first section is a file header that indicates the size of the file and the number of discrete data types that are contained within the file. A second section is a set of file handling instructions that instruct how to process the data. A third section is the collection of the data to be processed. A fourth section is a transmission footer utilized to validate the data transmitted.

Figure 14:
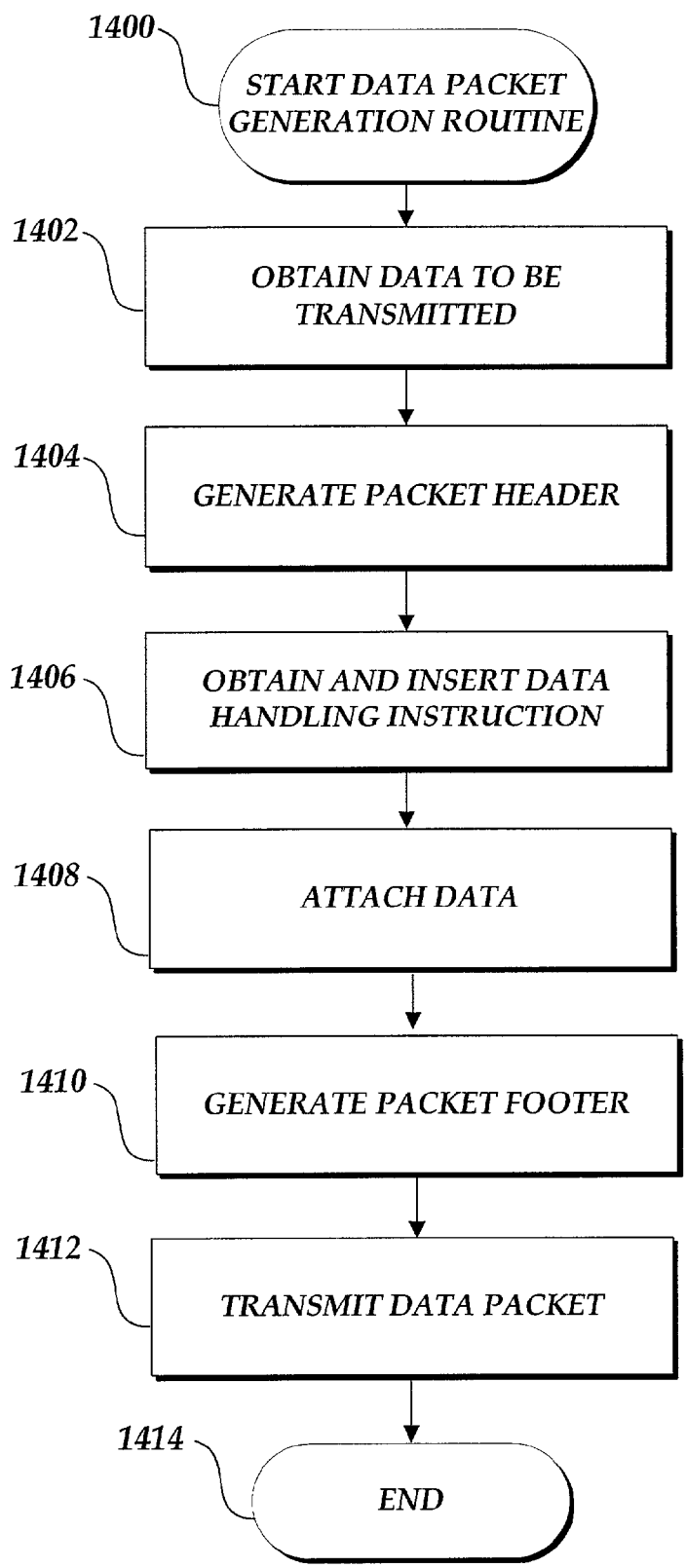
FIG. 14 is a flow diagram illustrative of a data packet transmission routine in accordance with the present invention.

FIG. 14 is a flow diagram illustrative of data packet transmission routine 1400 implemented by a transmitting component in accordance with the present invention. At block 1402, the transmitting component obtains the data to be transmitted/processed. In an actual embodiment of the present invention, the data can include monitoring device 34 data, rules data, control applet data, and the like. At block 1404, the transmitting component generates a packet header that identifies the size of the file and the number of data types that are contained within the file.

At block 1406, the transmitting component generates data handling instructions and inserts them into a second portion of the data packet. At block 1408, the transmitting component inserts the data to be processed into the packet. At block 1410, the transmitting component inserts a packet footer into the packet. In an illustrative embodiment of the present invention, the packet footer can include data parity information, checksums, data maps and the like to allow for the verification of a proper transmission.

At block 1412, the packet is complete and the transmitting component transmits the data packet. At block 1414, the routine 1400 terminates. In accordance with the illustrative embodiment, once the receiving component obtains the packet, the packet receipt is acknowledged. If the packet can be verified, the receiving component may then process the data. Alternatively, if the verification process is not successful, the receiving component may request a retransmittal.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method, comprising:
categorizing monitoring device data based on a source of the monitoring device data, wherein categorizing the monitoring device data includes determining whether the monitoring device data was generated at least in part, by an identifiable object, the identifiable object having a determined capability of independent activity in generating the monitoring device data;
obtaining a set of rules from a database, wherein the set of rules includes at least one of: an asset rule for monitoring device data characterized as asset data, a resource rule for monitoring device data characterized as resource data, and a device rule for monitoring device data characterized as event data;
determining from the set of rules whether one or more rules that are based on the categorization of the monitoring device data are found, wherein at least one rule of the set of rules applies to monitoring device data characterized as corresponding to an independent object and wherein at least another rule of the set of rules applies to monitoring device data characterized as not corresponding to an independent object;
processing the monitoring device data according to the one or more rules that are found by causing instructions to be executed by a computing device in response to any of the one or more rules that are based on the categorization of the monitoring device data; and
determining whether the monitoring device data is outside a range of the one or more rules that are found, where the range defines a rule violation.

2. The method as recited in claim 1, further comprising generating an output on a display, wherein the output that is displayed is based on whether the monitoring device data is outside the range that defines the rule violation.

3. The method as recited in claim 2 wherein generating an output based on the rule violation further includes generating an output confirming the identity of a user attempting to log onto the computing device network.

4. The method as recited in claim 3, wherein the output confirming the identity of the user includes receiving and processing a communication from one or more authorized users in a call back.

5. The method as recited in claim 3, wherein the output confirming the identity of the user includes a communication to one or more authorized users including a personal identification number.

6. The method as recited in claim 5, further comprising comparing an inputted personal identification number to the personal identification number communicated to the one or more authorized users.

7. The method as recited in claim 2, wherein generating an output based on the rule violation includes generating an output terminating access to the computing device network if a user identity cannot be confirmed.

8. A computer system having a processor, a memory, and an operating system, the computer system operable to perform the method recited in claim 1.

9. The method as recited in claim 1, wherein the at least one of the set of rules is correlated to an object includes at least one rule correlated to an object capable of independent action.

10. The method as recited in claim 1, wherein the at least one of the set of rules is correlated to an object includes at least one rule correlated to an object not capable of independent action.

11. A non-transitory computer-readable medium having computer executable instructions for performing a method comprising:
categorizing monitoring device data based on a source of the monitoring device data, wherein categorizing the monitoring device data includes determining whether the monitoring device data was generated, at least in part, by an identifiable object, the identifiable object having a determined capability of independent activity in generating the monitoring device data;
obtaining a set of rules from a database, wherein the set of rules includes at least one of: an asset rule for monitoring device data characterized as asset data, a resource rule for monitoring device data characterized as resource data, and a device rule for monitoring device data characterized as event data;
determining from the set of rules whether one or more rules that are based on the categorization of the monitoring device data are found, wherein at least one rule of the set of rules applies to monitoring device data characterized as corresponding to an independent object and wherein at least another rule of the set of rules applies to monitoring device data characterized as not corresponding to an independent object;
processing the monitoring device data according to the one or more rules that are found by causing instructions to be executed by a computing device in response to any of the one or more rules that are based on the categorization of the monitoring device data; and
determining whether the monitoring device data is outside a range of the one or more rules that are found, where the range defines a rule violation.

12. A method, comprising:
associating an object with a location identifier and a source of monitoring device data, the object having a determined capability of independent activity in generating the monitoring device data;
receiving monitoring device data associated with the location identifier;
obtaining a set of rules from a database, wherein the set of rules includes at least one of: an asset rule for monitoring device data characterized as asset data, a resource rule for monitoring device data characterized as resource data, and a device rule for monitoring device data characterized as event data;
determining from the set of rules, using a computing device, if one or more rules that correspond to a data type of the monitoring device data are found, wherein at least one rule of the set of rules applies to monitoring device data characterized as corresponding to an object and wherein at least one rule of the set of rules applies to monitoring device data characterized as not corresponding to an object;
creating a record including the monitoring device data associated with the location identifier; and
determining, using the computing device, if the movement of the object is authorized based on the monitoring device data if the one or more rules are found.

13. The method as recited in claim 12, further comprising generating an output of a video record including identification information and location information for the object.

14. The method as recited in claim 13, further comprising obtaining time of day monitoring device data and wherein the video record further includes the time of day monitoring device data.

15. The method as recited in claim 12, wherein the monitoring device data is associated with a fixed location.

16. The method as recited in claim 12, wherein the monitoring device data is associated with a variable location.

17. The method as recited in claim 12 wherein the monitoring device data comes from a bar code scanner.

18. The method as recited in claim 12, further comprising receiving the one or more rules that correspond to the data type of the monitoring device data, the one or more rules including an asset rule.

19. The method as recited in claim 18, wherein the one or more rules are associated with determining whether an asset corresponding to the location identifier is properly located within a premises.

20. The method as recited in claim 18, wherein the one or more rules are used to associate a location of asset data within a premises based on the monitoring device data.

21. The method as recited in claim 18, further comprising receiving one or more rules corresponding to identification tracking, location monitoring devices, and a resource rule from a separate monitoring device.

22. A non-transitory computer-readable medium having computer-executable instructions for performing the method recited in claim 12.

23. A computer system having a processor, a memory, and an operating system, the computer system operable to perform the method recited in claim 12.

24. The method as recited in claim 12, wherein the at least one of the set of rules is correlated to an independent object includes at least one rule correlated to an object capable of independent action.

25. The method as recited in claim 12, wherein the at least one of the set of rules is correlated to an object includes at least one rule correlated to an object not capable of independent action.

26. A method, comprising:
categorizing monitoring device data from an access control monitoring device, the characterization based on a determination of whether the access control monitoring device data corresponds to an identifiable object that generated, at least in part, the identifiable object having a determined capability of independent activity for generating monitoring device data;
obtaining a set of rules from a database, wherein the set of rules includes at least one of: an asset rule for monitoring device data characterized as asset data, a resource rule for monitoring device data characterized as resource data, and a device rule for monitoring device data characterized as event data;
determining from the set of rules, using a computing device, whether one or more rules that correspond to the monitoring device data are found, the one or more rules configured to establish access rights for the access control monitoring device, wherein at least one rule of the set of rules applies to monitoring device data characterized as corresponding to an object and wherein at least one rule of the set of rules applies to monitoring device data not characterized as corresponding to an object; and determining, using a computing device, whether an individual has access rights to the access control monitoring device by determining whether the monitoring device data is outside a range of the one or more rules that are found, where the range defines a rule violation.

27. The method as recited in claim 26, wherein the access control monitoring device is associated with a geographic location.

28. The method as recited in claim 26, further comprising generating an output on a display, wherein the output that is displayed indicates a grant or denial of access by the access control monitoring device.

29. The method as recited in claim 28, wherein generating an output includes releasing the access control monitoring device if the individual has access rights to the access control monitoring device.

30. The method as recited in claim 28, wherein generating an output includes generating an alarm if the individual does not have access rights to the access control monitoring device.

31. The method as recited in claim 26, wherein the access control monitoring device is one of a plurality of access control devices that are remote from each other.

32. A non-transitory computer-readable medium having computer executable instructions for performing the method of claim 26.

33. The method as recited in claim 26, wherein the at least one of the set of rules is correlated to an independent object includes at least one rule correlated to an object capable of independent action.

34. The method as recited in claim 26, wherein the at least one of the set of rules is correlated to an object includes at least one rule correlated to an object not capable of independent action.

35. A computer system having a processor, a memory, and an operating system, the computer system operable to perform a method comprising:

categorizing monitoring device data from an access control monitoring device, the characterization based on a determination of whether the access control monitoring device data corresponds to an identifiable object that generated, at least in part, the identifiable object having a determined capability of independent activity for generating monitoring device data;

obtaining a set of rules from a database, wherein the set of rules includes at least one of: an asset rule for monitoring device data characterized as asset data, a resource rule for monitoring device data characterized as resource data, and a device rule for monitoring device data characterized as event data;

determining from the set of rules, using a computing device, whether one or more rules that correspond to the monitoring device data are found, the one or more rules configured to establish access rights for the access control monitoring device, wherein at least one rule of the set of rules applies to monitoring device data characterized as corresponding to an object and wherein at least one rule of the set of rules applies to monitoring device data not characterized as corresponding to an object; and determining, using a computing device, whether an individual has access rights to the access control monitoring device by determining whether the monitoring device data is outside a range of the one or more rules that are found, where the range defines a rule violation.

* * * * *